United States Patent
Lattanzio et al.

(10) Patent No.: US 11,093,937 B2
(45) Date of Patent: *Aug. 17, 2021

(54) PROCESSING A FINANCIAL TRANSACTION USING SINGLE USE FINANCIAL ACCOUNT CARD NUMBER VIA PORTABLE COMMUNICATION DEVICE

(71) Applicant: B&H SERIES OF THE DOMPHIA, LLC, Las Vegas, NV (US)

(72) Inventors: Christopher Robert Lattanzio, Las Vegas, NV (US); Joseph Thomas Ritorto, Jr., Las Vegas, NV (US)

(73) Assignee: B&H SERIES OF THE DOMPHIA, LLC, Las Vegas, NV (US)

( * ) Notice: Subject to any disclaimer, the term of this patent is extended or adjusted under 35 U.S.C. 154(b) by 244 days.

This patent is subject to a terminal disclaimer.

(21) Appl. No.: 16/041,534

(22) Filed: Jul. 20, 2018

(65) Prior Publication Data
US 2018/0349892 A1      Dec. 6, 2018

Related U.S. Application Data

(63) Continuation of application No. 12/959,034, filed on Dec. 2, 2010, now Pat. No. 10,032,163.

(51) Int. Cl.
*G06Q 20/38* (2012.01)
*G06Q 20/02* (2012.01)
(Continued)

(52) U.S. Cl.
CPC .......... *G06Q 20/385* (2013.01); *G06Q 20/02* (2013.01); *G06Q 20/10* (2013.01); *G06Q 20/12* (2013.01); *G06Q 20/40* (2013.01)

(58) Field of Classification Search
CPC ...... G06Q 20/385; G06Q 20/10; G06Q 20/12; G06Q 20/02; G06Q 20/04; G06Q 20/401; G06F 21/34
See application file for complete search history.

(56) References Cited

U.S. PATENT DOCUMENTS 4,885,778 A * 12/1989 Weiss .................. G07F 7/10
                                                    713/184
6,000,832 A    12/1999 Franklin et al.
(Continued)

FOREIGN PATENT DOCUMENTS

AU       2006348401          5/2008
WO       2008060290          5/2008
WO       WQ-2008060290 A2 *  5/2008  ........... H04L 9/0662

OTHER PUBLICATIONS

"All-In-One Credit Card". <http://www.yankodesign.com/2009/10/22/all-in-one-credit-card/> Oct. 22, 2009, retrieved on Mar. 9, 2011, 23 pages.
(Continued)

*Primary Examiner* — Rajesh Khattar
*Assistant Examiner* — Carol A See
(74) *Attorney, Agent, or Firm* — Amin, Turocy & Watson, LLP

(57) ABSTRACT

System(s), method(s), and device(s) that generate and use single-use financial account card numbers (SUFACNs) to facilitate secure processing of financial transactions are presented. A user registers a financial account(s) with a financial transaction platform (FTP), a user profile comprising user-related information is created, and a personal identification number (PIN) is associated with the user. When making a purchase locally or online, the user's portable communication device (PCD) accesses the FTP via an application or web site, the PCD synchronizes with the FTP, and the PCD and FTP each respectively generate the same SUFACN(s) based in part on time of generation and PIN. The SUFACN is presented to the seller's register component via scanning (e.g., when SUFACN is a barcode) or entering the SUFACN. The register component sends the SUFACN (Continued)

to the FTP, which interacts with the user's financial account(s) to facilitate payment.

20 Claims, 13 Drawing Sheets

(51) Int. Cl.
*G06Q 20/10* (2012.01)
*G06Q 20/12* (2012.01)
*G06Q 20/40* (2012.01)

(56) References Cited

U.S. PATENT DOCUMENTS

| | | | |
|---|---|---|---|
| 7,328,841 B1 | 2/2008 | Frenklakh | |
| 7,349,885 B2 | 3/2008 | Gangi | |
| 7,427,033 B1* | 9/2008 | Roskind | G06F 21/34 |
| | | | 235/380 |
| 7,708,198 B2 | 5/2010 | Gangi | |
| 7,712,658 B2 | 5/2010 | Gangi | |
| 7,784,687 B2 | 8/2010 | Mullen et al. | |
| 7,793,851 B2 | 9/2010 | Mullen | |
| 7,822,666 B1* | 10/2010 | Bursch | G06Q 20/10 |
| | | | 705/35 |
| 7,828,220 B2 | 11/2010 | Mullen | |
| 7,941,197 B2 | 5/2011 | Jain et al. | |
| 7,942,337 B2 | 5/2011 | Jain | |
| 2002/0046169 A1* | 4/2002 | Keresman, III | G06Q 20/105 |
| | | | 705/41 |
| 2002/0062249 A1* | 5/2002 | Iannacci | G06Q 20/105 |
| | | | 705/14.1 |
| 2003/0080183 A1* | 5/2003 | Rajasekaran | G06Q 20/04 |
| | | | 235/379 |
| 2006/0041759 A1 | 2/2006 | Kaliski, Jr. et al. | |
| 2006/0122931 A1 | 6/2006 | Walker et al. | |
| 2007/0130472 A1 | 6/2007 | Buer et al. | |
| 2007/0168265 A1* | 7/2007 | Rosenberger | G06Q 20/20 |
| | | | 705/30 |
| 2007/0198354 A1* | 8/2007 | Senghore | G07F 17/3255 |
| | | | 705/14.32 |
| 2007/0228161 A1 | 10/2007 | Fletcher | |
| 2008/0029607 A1 | 2/2008 | Mullen | |
| 2008/0035738 A1 | 2/2008 | Mullen | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065555 A1 | 3/2008 | Mullen | |
| 2008/0201265 A1 | 8/2008 | Hewton | |
| 2008/0301041 A1 | 12/2008 | Bruk | |
| 2008/0302869 A1 | 12/2008 | Mullen | |
| 2008/0302876 A1 | 12/2008 | Mullen | |
| 2009/0159663 A1 | 6/2009 | Mullen et al. | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159688 A1 | 6/2009 | Mullen et al. | |
| 2009/0159689 A1 | 6/2009 | Mullen et al. | |
| 2009/0159690 A1 | 6/2009 | Mullen et al. | |
| 2009/0159696 A1 | 6/2009 | Mullen | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |
| 2009/0159700 A1 | 6/2009 | Mullen et al. | |
| 2009/0159701 A1 | 6/2009 | Mullen et al. | |
| 2009/0159702 A1 | 6/2009 | Mullen | |
| 2009/0159703 A1 | 6/2009 | Mullen et al. | |
| 2009/0159704 A1 | 6/2009 | Mullen et al. | |
| 2009/0159705 A1 | 6/2009 | Mullen et al. | |
| 2009/0159706 A1 | 6/2009 | Mullen et al. | |
| 2009/0159707 A1 | 6/2009 | Mullen et al. | |
| 2009/0159708 A1 | 6/2009 | Mullen et al. | |
| 2009/0159709 A1 | 6/2009 | Mullen | |
| 2009/0159710 A1 | 6/2009 | Mullen et al. | |
| 2009/0159711 A1 | 6/2009 | Mullen et al. | |
| 2009/0159712 A1 | 6/2009 | Mullen et al. | |
| 2009/0159713 A1 | 6/2009 | Mullen et al. | |
| 2009/0160617 A1 | 6/2009 | Mullen et al. | |
| 2009/0276347 A1* | 11/2009 | Kargman | G06Q 20/385 |
| | | | 705/35 |
| 2009/0308921 A1 | 12/2009 | Mullen | |
| 2010/0312634 A1* | 12/2010 | Cervenka | G06Q 30/06 |
| | | | 705/14.38 |
| 2011/0276495 A1 | 11/2011 | Varadarajan et al. | |
| 2012/0066120 A1 | 3/2012 | Ringewald et al. | |

OTHER PUBLICATIONS

"Google Wallet". [http://www.google.com/wallet/], retrieved Sep. 26, 2011, 1 page.
"Why are merchants excited about Google Wallet?" [http://www.youtube.com/watch?v=gZGoXvzW4WU], May 25, 2011.
Office Action dated Jun. 9, 2017 for U.S. Appl. No. 12/959,034, 70 pages.
Office Action dated Jul. 17, 2015 for U.S. Appl. No. 12/959,034, 44 pages.
Office Action dated Oct. 12, 2012 for U.S. Appl. No. 12/959,034, 27 pages.
Notice of Allowance dated Mar. 26, 2018 for U.S. Appl. No. 12/959,034, 23 pages.
Office Action dated Apr. 27, 2012 for U.S. Appl. No. 12/959,034, 39 pages.
Office Action dated Oct. 7, 2016 for U.S. Appl. No. 12/959,034, 56 pages.
Office Action dated Dec. 18, 2014 for U.S. Appl. No. 12/959,034, 37 pages.

* cited by examiner

PROCESSING A FINANCIAL TRANSACTION USING SINGLE USE FINANCIAL ACCOUNT CARD NUMBER VIA PORTABLE COMMUNICATION DEVICE

CROSS-REFERENCE TO RELATED APPLICATION

This application is a continuation of, and claims priority to, U.S. patent application Ser. No. 12/959,034 (now U.S. Pat. No. 10,032,163), filed Dec. 2, 2010, and entitled "PROCESSING A FINANCIAL TRANSACTION USING SINGLE-USE FINANCIAL ACCOUNT CARD NUMBER VIA PORTABLE COMMUNICATION DEVICE," the entirety of which is incorporated herein by reference.

TECHNICAL FIELD

The disclosed subject matter generally relates to data communications, and, more particularly, processing a financial transaction using a single-use financial account card number via a portable communication device.

BACKGROUND

Credit cards, debit cards, and gift cards are often used to tender payment for desired products or services at stores, restaurants, online businesses, etc. Some drawbacks to using credit cards, debit cards, and gifts cards is that they can be stolen or lost, and then can be used by unauthorized users to access the card owner's account to charge the account to pay for products or services or obtain cash from the card owner's account (e.g., bank account, credit account), and replacement of a lost or stolen card can take a significant amount of time. Further, credit, debit, and gift card numbers can be stolen by others (e.g., persons watching the card owner use the card, store clerks who work at the business at which the card was presented, persons using theft devices to illegally obtain card information, etc.). Furthermore, with gift cards, there can be less accountability, as the card owner may not be able to be credited for unauthorized use of the gift card and/or more proof may be required from the gift card owner to demonstrate that the gift card owner owned the gift card, the monetary value of the gift card, etc.

On the other hand, many people today have portable communication devices (e.g., mobile phones, laptop computers, electronic notepads, electronic netbooks, etc.), which can quickly analyze and process data, can store large amounts of data, and can be used for a variety of different applications, including applications relating to finances. Further, persons can use such portable communication devices to securely connect with communication devices of financial institutions and other trusted entities to access financial account information or other information.

It is desirable for holders of financial accounts (e.g., credit card holder having a credit card account, debit card holder associated with a bank account, gift card holder associated with a gift account) to be able to securely make purchases at local businesses and online businesses. Further, it is desirable to reduce the burden of card holders to have to carry their cards.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Systems, methods, and devices that can generate and use single-use financial account card numbers (SUFACNs) to facilitate secure processing of financial transactions are presented, in accordance with various aspects and embodiments. In an aspect, a financial transaction management component (FTMC), which can be located on a communication device (e.g., portable communication device, such as a mobile phone, laptop computer, electronic notepad, electronic netbook, electronic reading device, etc.), can be employed to securely connect to (e.g., via Transport Security Layer (TSL) or Secure Sockets Layer (SSL) connection) and synchronize with a financial transaction platform (FTP) to facilitate generation of a SUFACN(s) (e.g., single-use credit card number, single-use debit card number, single-use gift card number, etc.) that can be provided to a register component (e.g., electronic cash register or computer with a financial transaction application for processing financial transactions) associated with a local or online business to purchase desired products or services, wherein the SUFACN can be utilized to facilitate payment for the purchase from one or more registered financial accounts associated with the communication device user. In an aspect, an SUFACN also can be a promotional or discount code that, for example, can provide a cost discount for a particular product or service. For instance, an SUFACN can be used not only as a secure code to facilitate payment for a desired product or service, but also to obtain a discount on the desired product or service; or a first SUFACN can be used to facilitate payment for the desired product or service and a second SUFACN can be used to facilitate obtaining a discount in cost for the desired product or service. In another aspect, the SUFACN can be an encrypted number that can be provided by the register component to the FTP, which can be directly or indirectly associated with a financial institution(s) associated with the financial account(s) of the user. As more fully disclosed herein, the FTP can validate a SUFACN received from a seller's register component, and can facilitate processing the financial transaction via one or more of the user's registered financial accounts.

In an aspect, the communication device user can utilize a portable communication device or another communication device (e.g., home computer) to access or enter an online web site associated with the FTP, and the user can request to be registered with the FTP, provide information relating to the user, including, for example, name, address, phone number, and information relating to one or more financial accounts of the user that the user desires to register for use in financial transactions. The FTP can create and store a user profile comprising the information relating to the user. In one embodiment, the FTP can be directly managed by a financial institution (e.g., bank or credit provider) with which the user has a financial account, or, in another embodiment, the FTP can be managed by a third-party entity (e.g., escrow service) that can act as an intermediary between the financial institutions, users, and businesses to facilitate securely processing transactions via use of the SUFACNs. As part of the registration process, the user can provide to the FTP, or the FTP can provide to the user, unique log in information (e.g., a user name and password, biometric information of the user (e.g., fingerprint related information, eye or retina related information, facial characteristic related information, etc.) which can be used by the user to allow the user's portable communication device to securely log in to the FTP, and a personal identification number (PIN), which can be used to facilitate generating SUFACNs. As desired, a financial transaction application can be downloaded from the FTP to the portable communication device, wherein the application can be used to facilitate generating SUFACNs when a financial transaction is desired to be made by the user. Additionally or alternatively, the communication device user can access a web site of the FTP to facilitate generating SUFACNs for desired financial transactions.

In another aspect, when a user desires to make a purchase using one or more financial accounts, which are registered with the FTP, the financial transaction application can be opened on the portable communication device or the web site of the FTP can be accessed by the portable communication device, and the user can enter the log in information into the appropriate fields in the user interface associated with the financial transaction application or web site, and can submit the log in information via a secured communication connection to the FTP to facilitate authenticating the user and associated portable communication device. The FTP can validate the received log in information and grant desired access rights to the user account of the user.

In an aspect, once logged in, the portable communication device also can be synchronized with the FTP, wherein a desired portion of the user profile can be downloaded via the secure communication connection to the portable communication device, and can be locally stored on the portable communication device, and a synchronization algorithm can be utilized by the portable communication device and FTP to synchronize them with each other and enable the portable communication device and FTP to be able to generate the same code(s) (e.g., one or more SUFACNs) at a given moment or period in time, wherein the numbers or characters of a code can be determined based at least in part on the time the code is generated, the PIN associated with the user, and a predefined SUFACN coding function (e.g., one way, elliptical, or exponential function) and/or an encryption algorithm. As desired, the portable communication device does not have to be connected to (although, if desired, it can be connected to) the FTP when the FTMC of the portable communication device generates the code, using the time of code generation and PIN as seeds, since the FTMC has been synchronized with the FTP. As desired, the code can be displayed on the user interface (UI) (e.g., display screen, touch screen display) as a unique SUFACN and/or as a bar code (or other readable or scannable code) that can be representative of the SUFACN.

When making the purchase, the portable communication device with the displayed SUFACN can be presented to the seller at a local business (e.g., at a physical business location) where the seller can use a bar code reader or other scanning device to scan the bar code or other readable code shown on the UI of the portable communication device, or, with regard to an online business, the communication device user can provide the SUFACN to the site of the online seller (e.g., enter the SUFACN in the appropriate data field on the seller's site), and the SUFACN can be received by the seller's register component. The register component can be securely and communicatively connected to, or can establish a secure communication connection with, the FTP, and can present the SUFACN and other financial transaction information (e.g., billing amount for the purchased product or service, seller information, etc.) to the FTP via the communication network (e.g., via an IP-based network and/or a mobile core network).

The FTP, which has been synchronized with the portable communication device, also can generate the same SUFACN (or same set of SUFACNs) as the portable communication device based at least in part on the time period (e.g., moment in time, time window) that is identified by the communication device and FTP during synchronization, the PIN associated with the user, and the predefined SUFACN coding function and/or encryption algorithm. When the FTP receives the SUFACN relating to the financial transaction, the FTP can compare the received SUFACN to the set (e.g., one or more) of SUFACNs that were generated by the FTP, and if the received SUFACN matches any of the SUFACNs in the set generated by the FTP, the FTP can identify the received SUFACN as being valid. If a received SUFACN does not match any of the SUFACNs in the set generated by the FTP, the FTP can identify the received SUFACN as invalid, and can decline to process the financial transaction and/or notify the seller and/or user, via a message to the seller's register component and/or user's portable communication device, that the SUFACN was declined or deemed invalid.

When the received SUFACN is identified as being valid, the FTP can facilitate processing the related financial transaction. If the FTP is managed by the financial institution associated with the financial account being used for the financial transaction, and the financial transaction is not otherwise disapproved (e.g., not enough funds or credit line available in the bank account, credit account, or gift card account), the FTP can apply the charged financial transaction amount to the user's credit card balance, or debit the financial transaction amount from the user's bank account or gift card account.

If the FTP is managed by a third-party entity, which is not directly affiliated with the financial institution(s), the FTP can communicate with and provide desired financial transaction information (e.g., financial transaction amount, or desired portion thereof; financial account number; seller information; etc.) to the financial institution(s) associated with the financial transaction, and the financial institution(s) can respond with an approval of the financial transaction, with a approved transaction number, or can deny the financial transaction.

In an aspect, when the user has registered multiple financial accounts, based at least in part on user selection (e.g., selection at time of purchase, or predefined selection) or analysis by the FTP, the FTP can allocate desired respective portions of the amount due on the purchase to be paid from respective financial accounts, in accordance with predefined financial transaction processing criteria (and associated predefined financial transaction processing rules). This can facilitate breaking up a large money purchase into smaller money purchases, for example, when the user does not have a single financial account that has sufficient available funds or credit to cover the large money purchase.

In still another aspect, when the payment relating to the financial transaction is approved by the financial institution(s), the FTP can generate an approval message comprising one or more approved transaction numbers, the monetary amount approved for payment, and/or other desired information, and send the approval message to the register component of the seller, or can forward the one or more approved transaction numbers received from the financial institution(s) to the register component of the seller, to facilitate completing the financial transaction. Additionally or alternatively, a financial account management component (FAMC) associated with a financial institution can directly transmit an approval message to the register component. In yet another aspect, the FTP can generate and transmit messages, such as an approval message or other messages or updates, to the portable communication device and/or another destination (e.g., email address) via text message, email, financial transaction application (e.g., when the application is opened or by push notification), or when the communication device is accessing the web site of the FTP, etc. An approval message or other message can comprise information relating to the financial transaction and/or the financial account(s) used in relation to the financial transaction (e.g., current account balance, previous transaction history, etc.).

In yet another aspect, the user can utilize a single-use operation, wherein the user can register with the FTP and a PIN for the user can be created (e.g., by the user or financial transaction platform). When desired, the user can log into the web site of the FTP, and can print out a single-use bar code (or other machine-readable code), gift card number, or credit card number (e.g., with photograph of the user, if desired or needed), wherein the monetary amount associated with the single-use code, gift card number, or credit card number can be covered via payment from a financial account of the user. The user has the option as to whether the financial account is to be registered with the FTP or is used only for that transaction. The user can present the printed single-use code, gift card number, or credit card number to the seller, or can enter the code or number into the appropriate field of the seller's online web site, to tender payment for purchase of a desired product or service, and the code or number can be presented to the FTP by the seller's register component for processing, as more fully disclosed herein.

To the accomplishment of the foregoing and related ends, the disclosed subject matter, then, comprises the features hereinafter fully described. The following description and the annexed drawings set forth in detail certain illustrative aspects of the disclosed subject matter. However, these aspects are indicative of but a few of the various ways in which the principles of the disclosed subject matter may be employed. Other aspects, advantages and novel features of the disclosed subject matter will become apparent from the following detailed description of the disclosed subject matter when considered in conjunction with the drawings.

DETAILED DESCRIPTION

Figure 1:
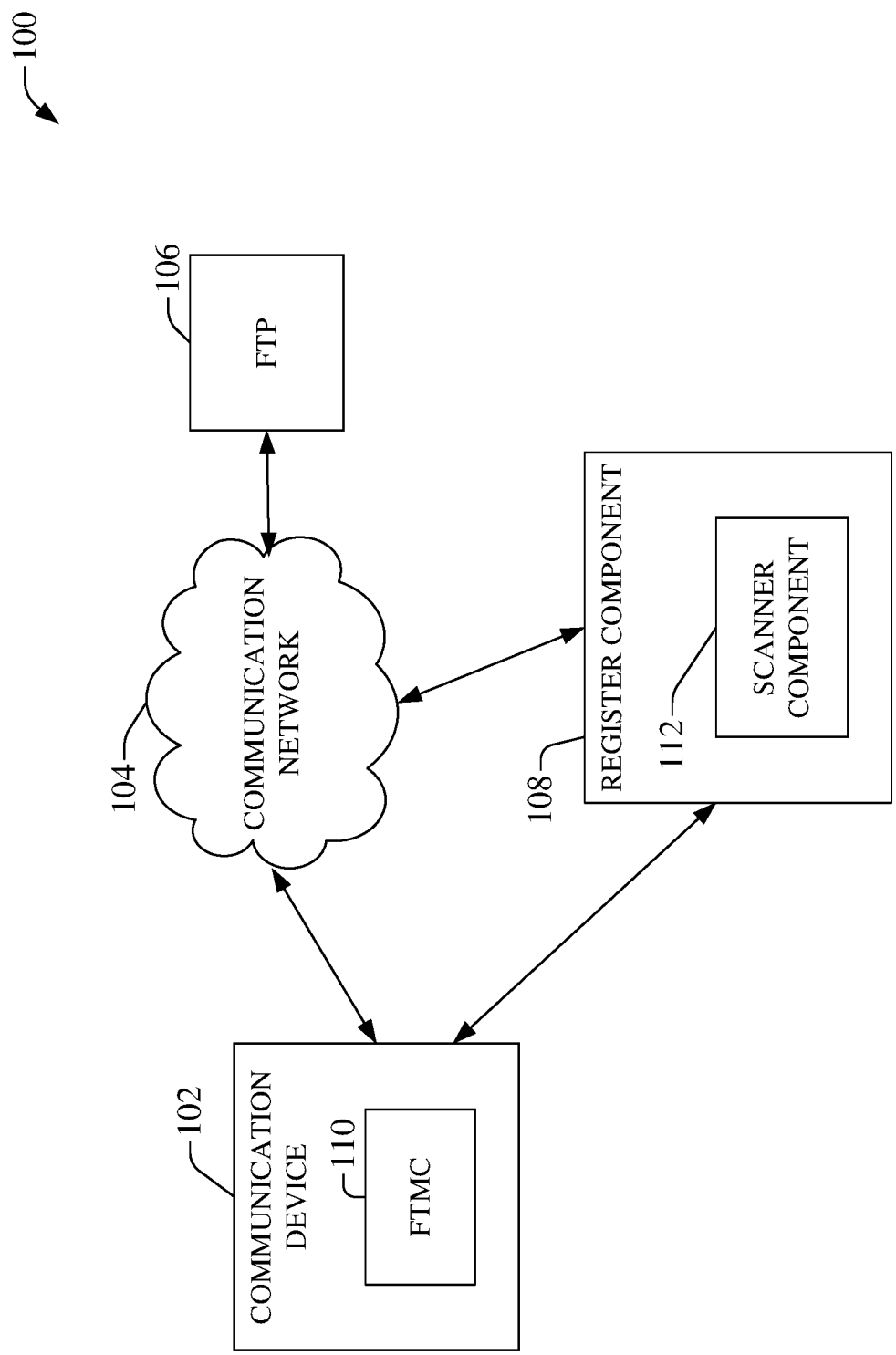
FIG. 1 is a block diagram of an example system that can generate and use single-use financial account card numbers (SUFACNs) to facilitate secure processing of financial transactions in accordance with various embodiments and aspects of the disclosed subject matter.

The subject specification is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the subject specification can or may be practiced without these specific details. In other instances, well-known structures and devices are shown in block diagram form in order to facilitate describing the subject specification.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Moreover, terms like "user equipment," "mobile station," "mobile," "subscriber station," "communication device," "access terminal," "terminal," "handset," and similar terminology, can refer to a wireless device (e.g., cellular phone, smart phone, computer (e.g., laptop computer), personal digital assistant (PDA), electronic notepad, electronic netbook, electronic reading device, set-top box, Internet Protocol Television (IPTV), electronic gaming device, multimedia recorder/player, video recorder/player, audio recorder/player, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

People frequently use credit, debit, or gift cards to make purchases of desired goods or services from local or online businesses. Drawbacks to such cards, include that they can be lost or stolen, or their card numbers can be stolen, and the cards or card numbers can be used by unauthorized users to make unauthorized purchases.

On the other hand, many people today have portable communication devices (e.g., mobile phones, laptop computers, electronic notepads, electronic netbooks, electronic reading devices, etc.), which can quickly analyze and process data, store large amounts of data, and be used for a variety of different applications, including applications relating to finances. Further, persons can use such portable communication devices to securely connect with communication devices of financial institutions and other trusted entities to access financial account information or other sensitive information.

It is desirable for holders of financial accounts (e.g., credit card holder having a credit card account, debit card holder associated with a bank account, gift card holder associated with a gift account) to be able to securely make purchases at local and online businesses. Further, it is also desirable to reduce the burden of card holders to have to carry their financial account cards.

To that end, system(s), method(s), and device(s) that generate and use single-use financial account card numbers (SUFACNs) to facilitate secure processing of financial transactions are presented. A user can register one or more financial accounts (e.g., credit card account, bank account, gift card account, etc.) with a financial transaction platform (FTP) using a desired communication device (e.g., portable communication device). In accordance with various embodiments, the FTP can be directly associated with a financial institution or can be associated with a third-party intermediary (e.g., escrow service) that facilitates secure processing of financial transactions between customers, sellers, and financial institutions. The FTP can create a user profile comprising user-related information, and a personal identification number (PIN) can be created (e.g., by the user or FTP) and be associated with the user. When making a purchase locally or online, the user's portable communication device (PCD) can access the FTP via an application or web site, the PCD can synchronize with the FTP, and the PCD and FTP each respectively can generate the same SUFACN(s) based at least in part on the time of generation and PIN. The SUFACN can be presented to the seller's register component via scanning (e.g., when SUFACN is a bar code or other machine-readable code) or entering the SUFACN into the register component. The register component can transmit the SUFACN to the FTP, and the FTP can interact with the user's financial account(s) to facilitate payment for the purchase from one or more of the user's financial accounts.

Referring to the drawings, FIG. 1 is a block diagram of an example system 100 that can generate and use single-use financial account card numbers (SUFACNs) to facilitate secure processing of financial transactions in accordance with various embodiments and aspects of the disclosed subject matter. In an aspect, the system 100 can comprise one or more communication devices, such as communication device 102, that can communicate with other communication devices that are associated with (e.g. communicatively connected to) a communication network 104 (e.g., network comprising an Internet Protocol (IP) based network and/or mobile core network) via a wired or wireless communication connection in a communication network environment. The communication device 102 can be, for example, a portable communication device, such as a mobile phone, laptop computer, electronic note pad, electronic netbook, electronic reading device, etc.

In another aspect, the system 100 can contain one or more financial transaction platforms, such as financial transaction platform (FTP) 106, that can be communicatively connected with the communication network 104, wherein an FTP can facilitate secure processing of financial transactions between communication device users, sellers of products or services, and financial institutions that provide and/or maintain financial accounts of respective communication device users. The system 100 also can include one or more register components, such as register component 108 (e.g., electronic cash register or computer with a financial transaction application for processing financial transactions), that can be associated with one or more sellers (e.g., merchants) that sell products or services to consumers, such as communication device users.

The communication device user can have one or more financial accounts, including, for example, one or more bank accounts, one or more credit card accounts, and/or one or more gift card accounts, which are respectively associated with (e.g., maintained and/or managed by) one or more financial institutions. In an aspect, the user can use the communication device 102 or another desired communication device (e.g., home personal computer) to connect to the FTP 106, for example, via an online web site or using an application (e.g., download an application associated with the FTP 106), to register one or more of the user's financial accounts with the FTP 106. The user can use the communication device 102 to request to be registered with the FTP 106, and can provide information relating to the user, including, for example, name, address, phone number, and information relating to one or more financial accounts of the user that the user desires to register for use in financial transactions. The FTP 106 can create and store (e.g., in an associated data store) a user profile comprising the information relating to the user and/or other desired information.

In one embodiment, the FTP 106 can be directly managed by a financial institution (e.g., bank or credit provider) with which the user has a financial account, or, in another embodiment, the FTP 106 can be managed by a third-party entity (e.g., escrow service) that can act as an intermediary between the financial institutions, users, and businesses to facilitate securely processing transactions via use of the SUFACNs (e.g., single-use credit card number, single-use debit card number, single-use gift card number, etc.). In an aspect, while an SUFACN can be used to facilitate payment from a financial account of a user, an SUFACN additionally or alternatively can be a promotional or discount code that, for example, can provide a cost discount for a particular product or service and/or can provide an additional benefit (e.g., a specified free item or free service with purchase of the particular product or service), and the cost discount or an additional benefit can be provided in relation to or applied to the financial transaction, wherein the discount or promotion can relate to or be offered by the seller (e.g., which also can be, or be associated with, a financial institution), a financial institution, an entity related to (e.g., providing) the service, an entity related to (e.g., manufacturing) the product, and/or another entity. For instance, an SUFACN can be used not only as a secure code to facilitate payment for a desired product or service, but also can be used to obtain a discount on the desired product or service; or a first SUFACN can be used to facilitate payment for the desired product or service and a second SUFACN can be used to facilitate obtaining a discount in cost for the desired product or service. As part of the registration process, the user can provide to the FTP 106 via the communication device 102, or the FTP 106 can provide to the user via the communication device 102, unique log in information (e.g., a user name and password, biometric information of the user (e.g., fingerprint related information, eye or retina related information, facial characteristic related information, etc.)) which can be used by the user to allow the user's communication device 102 to securely log in to the FTP 106, and a personal identification number (PIN), which can be used to facilitate generating SUFACNs for use in financial transactions.

In an aspect, a financial transaction application can be downloaded from the FTP 106 to the communication device 102, wherein the financial transaction application can be used to facilitate generating SUFACNs when a financial transaction is desired to be made by the user. Using a financial transaction application, the communication device user can use the communication device 102 and financial transaction application (e.g., mobile device financial transaction application) to access the FTP 106 via the communication network 104, or can use the communication device 102 and a financial transaction application (e.g., web-based financial transaction application) to access a web site of the FTP 106 via the communication network 104, to facilitate generating SUFACNs for desired financial transactions. A web-based financial transaction application can facilitate enabling different communication devices that operate using different operating or communication platforms to connect with the FTP 106 using the same web-based financial transaction application, as opposed to creating different mobile device financial transaction applications for the different operating or communication platforms of different communication devices.

In another aspect, the communication device 102 can include a financial transaction management component (FTMC) 110 (e.g., at least part of which can be installed on the communication device 102 as part of the download of the financial transaction application). The FTMC 110 can be employed to securely connect to (e.g., via Transport Security Layer (TSL) or Secure Sockets Layer (SSL) connection) and synchronize with the FTP 106 to facilitate generation of a SUFACN(s) that can be provided or presented to the register component 108 associated with a local or online business to purchase desired products or services, wherein the SUFACN can be utilized to facilitate payment for the purchase from one or more registered financial accounts associated with the communication device user. All or a desired portion of communications between components, such as the communication device 102, the FTP 106, the register component 108, or other components described herein, that communicate via the communication network 104 can communicate using secure communications, which can be processed or encrypted in accordance with a desired encryption algorithm, technique, protocol, or standard, such as, for example, the Federal Information Processing Standard (FIPS) or Advanced-Encryption-Standard-256 (AES-256) bit encryption. In an aspect, the SUFACN can be an encrypted number or alphanumeric value. The SUFACN can be provided by the register component 108 to the FTP 106, which can be directly or indirectly associated with a financial institution(s) associated with the registered financial account(s) of the user. As more fully disclosed herein, the FTP 106 can validate a SUFACN received from a seller's register component 108, and can facilitate processing the financial transaction via one or more of the user's registered financial accounts.

In another aspect, when a user desires to make a purchase using one or more registered financial accounts, the FTMC 110 can be accessed by opening the financial transaction application to facilitate connecting to the FTP 106 via the application and communication network 104 or by accessing the FTP 106 via the web site associated with the FTP 106, wherein the financial transaction application can facilitate performance of at least a portion of the functions of the FTMC 110. The user can enter the log in information (e.g., authentication information) into the appropriate fields in the user interface associated with the financial transaction application or web site via the communication device 102, and can submit the log in information via a secured communication connection to the FTP 106 to facilitate authenticating the user and associated communication device 102. The FTP 106 can evaluate the received log in information and can grant desired access rights to the user account of the user when the presented log in information is valid (e.g., matches stored authentication information (e.g., authentication credentials) associated with the user), or can deny access to the FTP 106 when the presented log in information is invalid (e.g., does not match stored authentication information associated with the user).

In an aspect, once logged in, the communication device 102 (e.g., FTMC 110 contained therein) can be synchronized with the FTP 106, wherein all or a desired portion of the user profile can be downloaded via the secure communication connection from the FTP 106 to the communication device 102, and can be locally stored on the communication device 102 (e.g., stored in a data store associated with the communication device 102), and a synchronization algorithm can be utilized by the communication device 102 and FTP 106 to synchronize them with each other and enable the communication device 102 and FTP 106 to be able to generate the same code(s) (e.g., one or more SUFACNs) based at least in part on a given moment or period in time (e.g., synchronized time window) as identified by the communication device 102 and FTP 106 during synchronization, wherein a SUFACN can be determined based at least in part on the synchronized time window, the PIN associated with the user, and a predefined coding function (e.g., one way, elliptical, or exponential function) and/or an encryption algorithm. As desired, the communication device 102 does not have to be connected to (although, if desired, it can be connected to) the FTP 106 when the FTMC 110 of the portable communication device 102 generates the code (e.g., SUFACN(s)), using the synchronized time window and PIN as seeds, since the FTMC 110 has been synchronized with the FTP 106. As desired, the code can be displayed on the user interface (UI) (e.g., display screen, touch screen display) as a unique SUFACN and/or as a bar code (or other machine-readable or machine-scannable code) that can be representative of the SUFACN, for example, when the product or service purchase is being made by the user.

When making the purchase, the communication device 102 with the displayed SUFACN can be presented to the seller at a local business (e.g., at a physical business location) where the seller can use a scanner component 112 (e.g., a bar code reader or other scanning device) to scan the bar code or other machine-readable code shown on the UI of the communication device 102, or, with regard to an online business, the communication device user can use the communication device 102 to provide the SUFACN to the site of the online seller (e.g., enter the SUFACN in the appropriate data field on the seller's site), and the SUFACN can be received by the seller's register component 108. The register component 108 can be securely and communicatively connected to, or can establish a secure communication connection with, the FTP 106, and can present the SUFACN and other financial transaction information (e.g., billing amount for the purchased product or service, seller information, etc.) to the FTP 106 via the communication network 104 (e.g., via the IP-based network and/or mobile core network).

It is to be appreciated and understood that, while the subject specification often describes a communication device as a portable communication device (e.g., mobile phone, laptop computer) communicating wirelessly in the communication network 104 and being used to facilitate secure processing of financial transactions, the subject specification is not so limited, as, in accordance with other aspects and embodiments, a communication device can be connected via a wireline communication connection and can be, for example, a home computer, and such communication device can be used to facilitate processing secure financial transactions in relation to purchases from online sellers or can be used to print out SUFACNs on a document (e.g., paper document, electronic document) for use in relation to a financial transaction relating to a purchase of a desired product or service.

The FTP 106, which has been synchronized with the communication device 102, also can generate the same SUFACN (or same set of SUFACNs) as the communication device 102 based at least in part on the synchronized time window or period (e.g., given moment in time, given period of time) as identified by the communication device 102 and FTP 106 during synchronization, the PIN associated with the user, and/or the predefined coding function and/or encryption algorithm. When the FTP 106 receives the SUFACN relating to the financial transaction, the FTP 106 can compare the received SUFACN to the set (e.g., one or more) of SUFACNs that were generated by the FTP 106, and if the received SUFACN matches any of the SUFACNs in the set generated by the FTP 106, the FTP 106 can identify the received SUFACN as being valid. If a received SUFACN does not match any of the SUFACNs in the set generated by the FTP 106, the FTP 106 can identify the received SUFACN as invalid, and can decline to process the financial transaction and/or notify the seller and/or communication device user, via a message to the seller's register component 108 and/or user's communication device 102 (e.g., via text message, pushed notification to the financial transaction application, etc.), that the SUFACN was declined or deemed invalid.

When the received SUFACN is identified as being valid, the FTP 106 can facilitate processing the related financial transaction. If the FTP 106 is managed by the financial institution associated with the financial account being used for the financial transaction, and the financial transaction is not otherwise disapproved (e.g., not enough funds or credit line available in the bank account, credit account, or gift card account), the FTP 106 can apply the charged financial transaction amount to the user's credit card balance, or debit the financial transaction amount from the user's bank account or gift card account.

If the FTP 106 is managed by a third-party entity, which is not directly affiliated with the financial institution(s), the FTP 106 can communicate with and provide desired financial transaction information (e.g., financial transaction amount, or desired portion thereof; financial account number relating to the financial account of the user with the financial institution; seller information; etc.) to the financial institution(s) associated with the financial transaction, and the financial institution(s) (e.g., communication device associated with the financial institution(s)) can respond to the FTP 106 with a message, such as a message approving payment for the financial transaction, with an approved transaction number, or a message denying payment for the financial transaction. In one aspect, if payment is denied by a financial institution for a particular financial account, the FTP 106 can attempt to process (e.g., automatically send a request for payment) the financial transaction through another of the user's financial accounts, if any, or send a message to the communication device 102 to notify the user of the denial of payment and inquire as to whether the user desires to attempt to process payment via another financial account of the user.

In an aspect, if an SUFACN(s) relates to a promotion or discount, the FTP 106 can contact a communication device and/or management component associated with the entity that offered the promotion or discount, and can provide a request that the entity honor the discount or promotion and further can provide desired information relating to the financial transaction to the entity to facilitate obtaining approval for the discount or promotion (e.g., discounting the cost of product or service, providing a promotional item or service, etc.). The entity can respond, via its communication device or management component, with an approval message, to the FTP 106, to approve providing the discount or other promotional benefit (e.g., promotional item or service) to the user, or can transmit a denial message, to the FTP 106, denying the discount or other promotional benefit, for example, if specified promotional criteria has not been met.

In still another aspect, when the user has registered multiple financial accounts, based at least in part on user selection (e.g., selection at time of purchase, or predefined selection by the user) and/or analysis by the FTP 106, the FTP 106 can allocate desired respective portions of the amount due on the purchase to be paid from respective financial accounts of the user, in accordance with predefined financial transaction processing criteria (and associated predefined financial transaction processing rules). This can facilitate breaking up a particular money purchase (e.g., a large money purchase) into smaller money purchases, for example, when the user does not have a single financial account that has sufficient available funds or credit to cover the entire particular money purchase, and/or a first financial account has a more favorable interest rate than a second financial account but the first financial account does not have sufficient available credit to cover the entire particular money purchase, and/or a first financial account is a bank account and it is desired to not have the available funds in the bank account to fall below a predefined threshold amount of money, etc.

Figure 3:
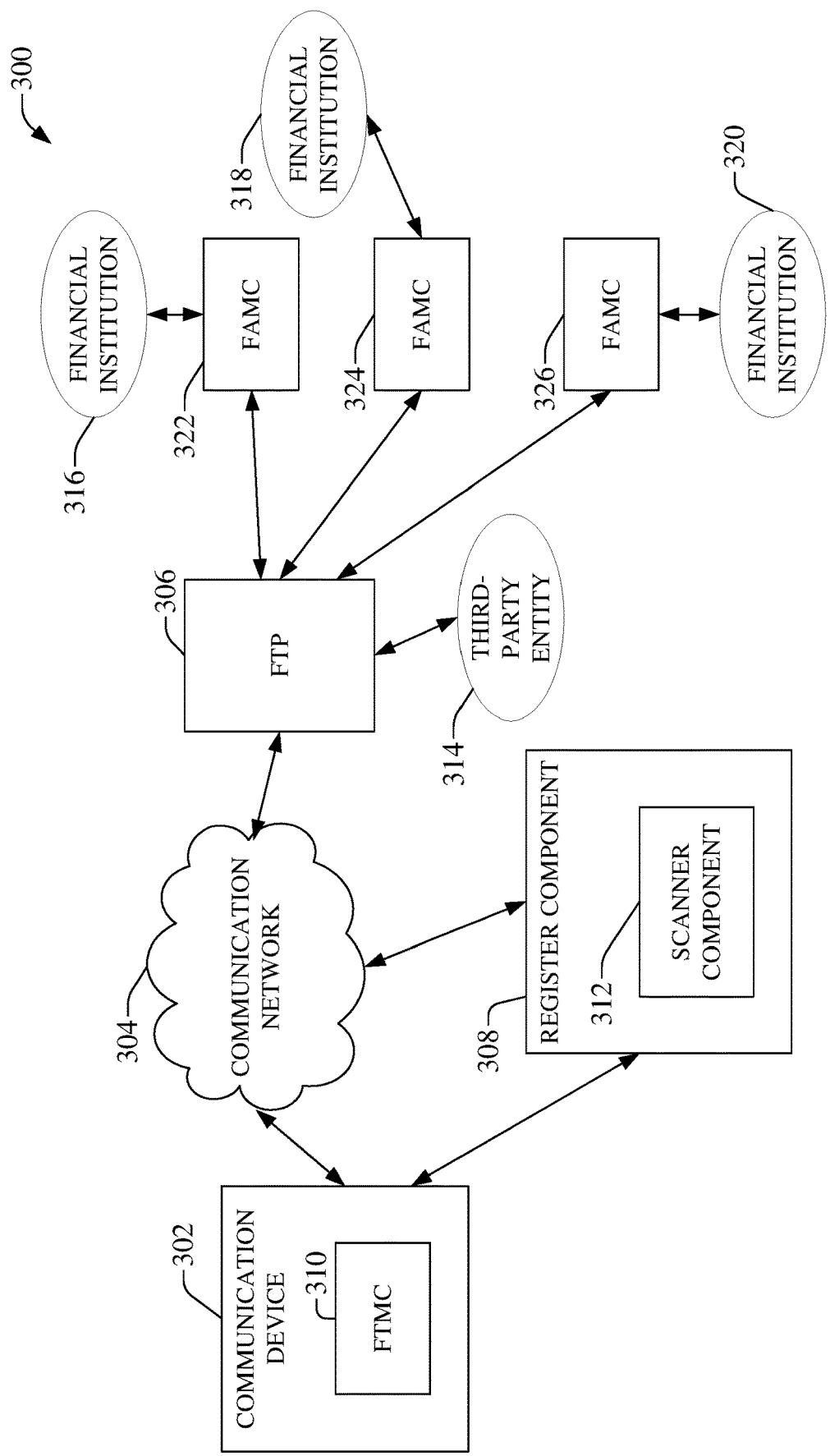
FIG. 3 illustrates a block diagram of an example system that can employ an FTP associated with a third-party entity (e.g., escrow service) to facilitate secure processing of financial transactions via generation and use of SUFACNs in a communication network in accordance with various embodiments and aspects of the disclosed subject matter.

In yet another aspect, when the payment relating to the financial transaction is approved by the financial institution(s), the FTP 106 can generate one or more approved transaction numbers or can forward an approval message comprising the one or more approved transaction numbers (e.g., credit approval number, debit approval number, gift card approval number) received from the financial institution(s), the monetary amount approved, and/or other desired information to the register component 108 of the seller to facilitate completing the financial transaction. Additionally or alternatively, a financial account management component (FAMC) (not shown in FIG. 1; e.g., as depicted in FIG. 3) associated with a financial institution can directly transmit an approval message to the register component 108. In yet another aspect, the FTP 106 can generate and transmit a message, such as an approval message, other message, or update, to the communication device 102 and/or another destination (e.g., email address) via text message, email, financial transaction application (e.g., when the application is opened or by push notification), or when the communication device 102 is accessing the web site of the FTP 106, etc. A message can comprise information relating to the financial transaction and/or the financial account(s) used in relation to the financial transaction (e.g., current account balance, previous transaction history, etc.), to facilitate notifying the user of information relating to the financial transaction and/or the financial account(s).

In still another aspect, the user can utilize a single-use operation, wherein the user can register with the FTP 106 via the communication device 102, and a PIN for the user can be created (e.g., by the user or FTP 106). When desired, the user can log into the web site of the FTP 106, and can print out or save (e.g., store) a single-use bar code (or other machine-readable code), gift card number, or credit card number (e.g., with photograph of the user, if desired or needed), wherein the monetary amount associated with the single-use code, gift card number, or credit card number can be covered via payment from a financial account(s) of the user. The user can have the option regarding whether the financial account(s) is to be registered with the FTP 106 or is used only for that particular transaction. The user can present the printed single-use code, gift card number, or credit card number to the seller (e.g., via a printed document, which can be scanned), or can enter the code or number into the appropriate field of the seller's online web site and associated register component 108 (or the code or number can be entered into a register component 108 associated with a local seller), to tender payment for purchase of a desired product or service, and the code or number can be presented to the FTP 106 by the seller's register component 108 for processing, as more fully disclosed herein.

The subject specification, generating and using SUFACNs to facilitate payment from a financial account(s) for purchases of products and services, can facilitate improved security in processing financial transactions over conventional systems and methods. The SUFACN is used one time for that particular transaction, thus, if an unauthorized person discovers the SUFACN, it will be of no use to the unauthorized person, since the SUFACN was only valid for the particular transaction. Further, the communication device user does not have to be concerned with carrying a variety of different bank, credit, and/or gift cards on his or her person, as the communication device user can use the user's communication device to facilitate processing payment for the purchase.

Figure 2:
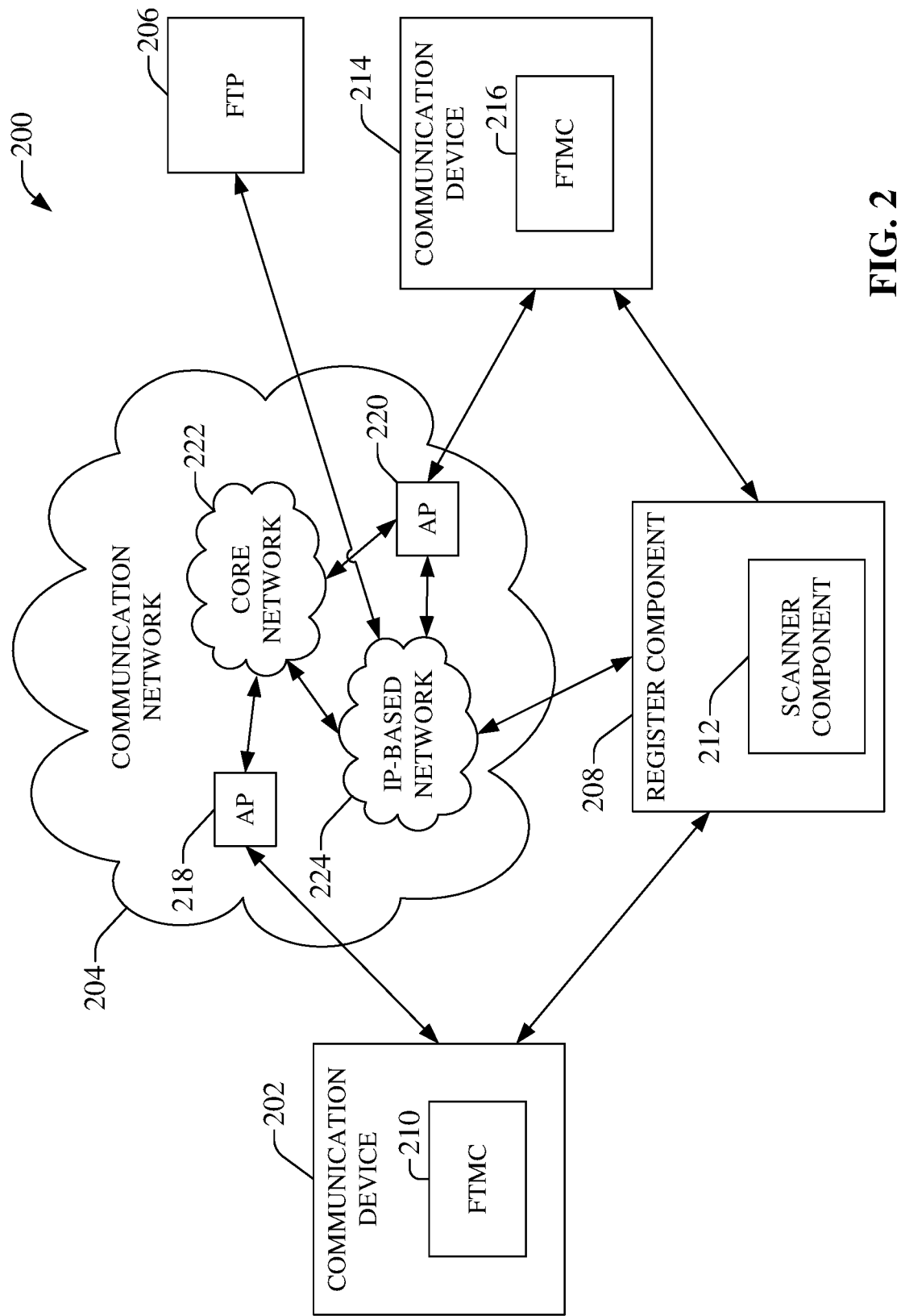
FIG. 2 depicts a block diagram of an example system that can generate and use SUFACNs to facilitate secure processing of financial transactions in a communication network in accordance with various embodiments and aspects of the disclosed subject matter.

FIG. 2 depicts a block diagram of an example system 200 that can generate and use SUFACNs to facilitate secure processing of financial transactions in a communication network in accordance with various embodiments and aspects of the disclosed subject matter. The system 200 can comprise one or more communication devices, such as communication device 202 (e.g., mobile phone, laptop computer, etc.) and communication device 214, which can communicate with other communication devices operating in a communication network 204 and can be used to purchase desired products or services via use of SUFACNs, which can facilitate secure processing of financial transactions relating to purchases. The system 200 also can include one or more FTPs, such as FTP 206, that can be communicatively connected to the communication network 204 and can facilitate secure processing of financial transactions via use of SUFACNs. The system 200 further can contain one or more register components, such as register component 208, that can be communicatively connected to the communication network 204 and can be employed by one or more sellers of products or services to facilitate processing financial transactions relating to the sale of products or services to customers, such as, for example, the user of the communication device 202.

In an aspect, the communication device 202 and communication device 214 can respectively include FTMC 210 and FTMC 216 that respectively can be used to synchronize with the FTP 206 to facilitate proper generation and presentation of SUFACNs. In another aspect, the register component 208 optionally can contain a scanner component 212 (e.g., a register component 208 associated with a local business can include a scanner component 212, a register component 208 associated with an online business may or may not have a scanner component 212) that can be employed to scan an SUFACN when it is in a machine-readable form (e.g., barcode form, optical character recognition (OCR) form, etc.). The communication devices (e.g., 202, 214), communication network 204, FTP(s) 206, register component(s) 208, FTMCs (e.g., 210, 216), and scanner component(s) 212, each can be the same or similar as, and/or can comprise the same or similar functionality as, respective components, such as more fully described herein, for example, with regard to system 100.

In an aspect, the communication network 204 can comprise an access point (AP) 218 and AP 220 that can be respectively associated with (e.g., communicatively connected to via a wireless connection) the communication device 202 and communication device 214 to facilitate communications by the communication devices 202 and 214 with other desired communication devices associated with the communication network 204. Each of AP 218 and 220 can serve a respective specified coverage area to facilitate communication by the respective communication devices 202 and 214 with other desired communication devices associated with the communication network 204. For example, the AP 218 can serve a respective coverage cell (e.g., macrocell, femtocell, picocell, etc.) that can cover a specified area, and the AP 218 can service mobile wireless communication devices, such as communication device 202, located in the respective area covered by the cell, where such coverage can be achieved via a wireless link (e.g., uplink (UL), downlink (DL)). When an attachment attempt is successful, the communication device 202 can be served by the AP 218 and incoming voice and data traffic can be paged and routed to the communication device 202 through the AP 218, and outgoing voice and data traffic from the communication device 202 can be paged and routed through the AP 218 to other communication devices (e.g., FTP 206, register component 208, communication device 214, etc.).

In accordance with an embodiment, the AP 218 can be a base station that can facilitate wireless communication (e.g., cellular communication) and can be connected to a core network 222 (e.g., mobile core network), which can facilitate communications by wireless communication devices (e.g., 202) with other communication devices (e.g., wired or wireless communication devices) associated with the communication network 204. In an embodiment, the AP 220 can be a base station or hotspot, which comprises and employs Wi-Fi, Wi-Max, or other desired wireless communication technology and protocols, wherein the AP 220 can be connected to an IP-based network 224 (e.g., the Internet) and can facilitate communications between communication device 214 and other communications devices, such as FTP 206, associated with the IP-based network 224. The core network 222 (e.g., 2G, 3G, 4G, or xG network, where x is virtually any desired integer or real value) can be connected to the IP-based network 224 to facilitate communication between communication devices, such as communication device 202, connected to the core network 222 and other communication devices, such as FTP 206, register component 208, and/or communication device 214, connected to the IP-based network 224.

The core network 222 and IP-based network 224, respectively, can allocate resources to communication devices in the respective networks, convert or enforce protocols, establish and enforce Quality of Service (QoS) for the communication devices respectively associated therewith, provide applications or services in the respective networks, translate signals, and/or perform other desired functions to facilitate system interoperability and communication in the respective wireless communication networks. The core network 222 and IP-based network, respectively, can include desired components, such as routers, nodes, switches, interfaces, controllers, gateways, etc., that can facilitate communication of data between communication devices in the communication network 204.

FIG. 3 depicts a block diagram of an example system 300 that can employ an FTP associated with a third-party entity (e.g., escrow service) to facilitate secure processing of financial transactions via generation and use of SUFACNs in a communication network in accordance with various embodiments and aspects of the disclosed subject matter. The system 300 can comprise one or more communication devices, such as communication device 302, which can communicate with other communication devices operating in a communication network 304 and can be used to purchase desired products or services via use of SUFACNs, which can facilitate secure processing of financial transactions relating to purchases. The system 300 also can include one or more FTPs, such as FTP 306, that can be communicatively connected to the communication network 304 and can facilitate secure processing of financial transactions via use of SUFACNs. The system 300 further can contain one or more register components, such as register component 308, that can be communicatively connected to the communication network 304 and can be employed by one or more sellers of products or services to facilitate processing financial transactions relating to the sale of products or services to customers, such as, for example, the user of the communication device 302.

In an aspect, the communication device 302 can include an FTMC 310 that can be used to synchronize with the FTP 306 to facilitate desired generation and presentation of SUFACNs. In another aspect, the register component 308 optionally can contain a scanner component 312 (e.g., a register component 308 associated with a local business can include a scanner component 312, a register component 308 associated with an online business may or may not have a scanner component 312) that can be employed to scan an SUFACN when it is in a machine-readable form (e.g., barcode form, optical character recognition (OCR) form, etc.). The communication device(s) 302, communication network 304, FTP(s) 306, register component(s) 308, FTMC(s) 310, and scanner component(s) 312, each can be the same or similar as, and/or can comprise the same or similar functionality as, respective components, such as more fully described herein, for example, with regard to system 100 and system 200.

In an aspect, the FTP 306 can be associated with a 3-party entity 314, such as an escrow service, that can act as an intermediary between purchasers (e.g., user of the communication device 302), sellers, and financial entities, such as financial institutions 316, 318, and 320, to facilitate secure processing of financial transactions via the communication network 304. The financial institutions 316, 318, and 320 each respectively can be associated with and can employ financial account management components (FAMCs) 322, 324, and 326 that can facilitate managing financial accounts and associated customer information of customers who have financial accounts with the respective financial institutions 316, 318, and 320.

In another aspect, when the user makes a purchase, and the communication device 302 presents an SUFACN to the register component 308 to facilitate that purchase, the SUFACN and related financial transaction information can be transmitted via the communication network 304 from the register component 308 to the FTP 306. The FTP 306 can analyze the SUFACN to validate it, and if validated, the FTP 306 can identify one or more financial accounts of the user that are registered with the FTP 306 from the user profile associated with the user. Depending in part on the level of trust that the user has given to the FTP 306 and associated third-party entity 314, the FTP 306 can have the financial account number of the financial account and/or can have additional information, such as access information (e.g., access code), that can allow the FTP 306 to obtain additional financial account information that can allow the FTP 306 to, for example, identify the amount of money in the user's bank account, the available credit on the user's credit card account, and/or the amount of monetary value available on the user's gift card, and/or other account information, such as the current interest rate on purchases (e.g., for a credit card account), purchase or reward points or other value that can be earned by the user when using a particular financial account.

In still another aspect, the user can specify the financial account desired to be used for a purchase at the time of purchase by selection of the desired financial account displayed on the communication device 302, or the user can pre-select the financial account to be used for purchases, wherein such financial account selection can be stored in the user profile. For example, the selection of a desired financial account at the time of purchase can be additional information that can be appended to the SUFACN and scanned by or entered into the register component 308. The user also can pre-select financial accounts based at least in part on the amount of the purchase (e.g., purchases below a threshold amount of money are to be paid via a first financial account, purchases at or above the threshold amount are to be paid via a second financial account), wherein such pre-selections can be stored in the user profile.

When the FTP 306 has all or a portion of the additional financial account information associated with a user's financial accounts, the FTP 306 can analyze information relating to the purchase (e.g., purchase price), user's current selection or pre-selection of financial account(s) to use for the purchase, available credit lines or funds of respective financial accounts, potential earned points or value for using a particular financial account, and/or other information from the user profile or relating to the purchase, to facilitate identifying one or more financial accounts to use to facilitate payment for the purchase by the user.

For example, if the user has financial accounts (e.g., credit card accounts) with financial institutions 316, 318, and 320, and has not selected a financial account(s) to be used with regard to a $500.00 purchase, and the FTP 306 has additional financial account information regarding the three financial accounts, wherein the additional financial information indicates to the FTP 306 that the available amount of credit for the first financial account is only $250.00, the available amount of credit for the second financial account is $800.00, and the available amount of credit for the third financial account is $200.00, the FTP 306 can facilitate processing the transaction in accordance with predefined financial transaction processing criteria (and associated predefined financial transaction processing rules). For instance, the FTP 306 can facilitate processing the financial transaction using the second financial account for payment since that account has sufficient available credit to pay for the entire purchase, if the predefined financial transaction processing criteria indicates that payment is to be made from a financial account with sufficient available funds or credit line to cover the entire cost of the purchase. As another example, the FTP 306 can allocate payment of $250.00 from the first financial account and $250.00 from the second financial account, if, for instance, the interest rate for the first financial account is lower than the interest rate for the second financial account, if the predefined financial transaction processing criteria specifies that payment for a purchase is to be made from a financial account having the lowest interest rate first up to the available amount of credit and any remaining balance owed, if any, can be allocated to be paid from one or more other financial accounts.

Other predefined financial transaction processing criteria can relate to, for example, when a bank account is to be used for a purchase (e.g., use bank account for purchase unless the account balance, after the financial transaction is processed, will be below a predefined threshold amount of money; if the account balance will be below the predefined threshold amount of money, allocate a portion of payment from the bank account to maintain an account balance at the predefined threshold and allocate the remaining amount to a credit account, or make payment using the credit account, based at least in part on the predefined financial transaction processing criteria applicable to the financial transaction), when a gift card account is to be used for a purchase (e.g., use the gift card account first before using a bank account or credit card account), when a credit card account is to be used for a purchase, cycling of financial accounts of the user (e.g., using a first financial account for a first transaction, cycling to a second financial account for a second financial transaction, cycling to a third financial account for a third transaction, . . . ), etc.

In accordance with an embodiment, the third-party entity 314 also can be a financial institution with which one or more users can have respective financial accounts that can be managed by a financial account management component (not shown), in addition to facilitating secure financial transactions between consumers, sellers, and financial institutions. In accordance with various embodiments, during a purchase, the third-party entity 314, acting as intermediary, can facilitate payment for the purchase from one or more financial institutions with which the customer has a financial account to the seller, or the third-party entity 314 can pay the seller directly and receive re-imbursement from one or more financial institutions with which the customer has a financial account.

Figure 4:
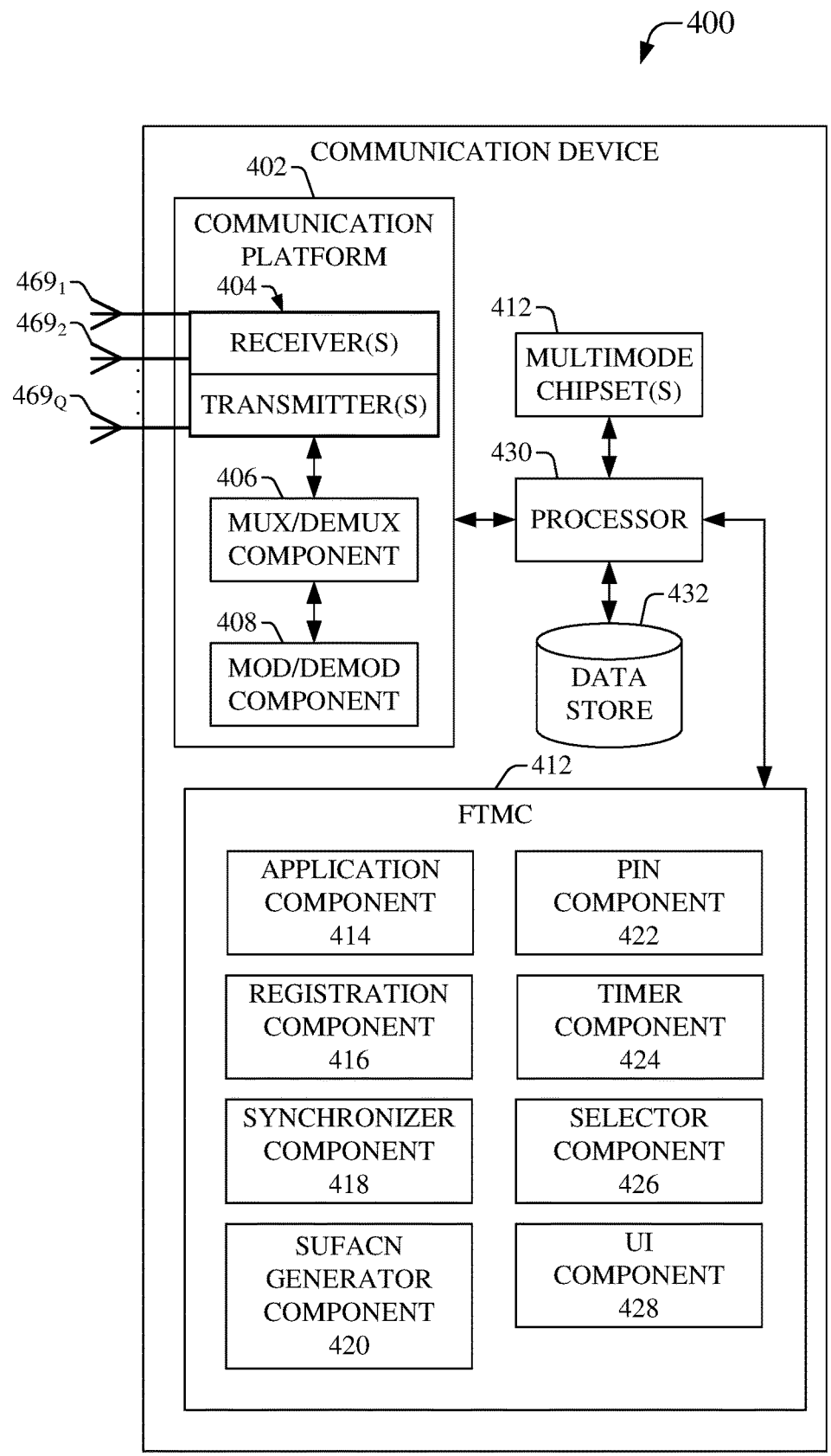
FIG. 4 depicts a block diagram of an example communication device in accordance with an embodiment of the disclosed subject matter.

FIG. 4 depicts a block diagram of an example communication device 400 in accordance with an embodiment of the disclosed subject matter. In an aspect, the communication device 400 can be a multimode access terminal, wherein a set of antennas $469_1$-$469_Q$ (Q is a positive integer) can receive and transmit signal(s) from and to wireless devices like access points, access terminals, wireless ports and routers, and so forth, that operate in a radio access network. It should be appreciated that antennas $469_1$-$469_Q$ are a part of communication platform 402, which comprises electronic components and associated circuitry that provide for processing and manipulation of received signal(s) and signal(s) to be transmitted; e.g., receivers and transmitters 404, multiplexer/demultiplexer (mux/demux) component 406, and modulation/demodulation (mod/demod) component 408.

In another aspect, the communication device 400 can include a multimode operation chipset(s) 410 that can allow the communication device 400 to operate in multiple communication modes in accordance with disparate technical specification for wireless technologies. In an aspect, multimode operation chipset(s) 410 can utilize communication platform 402 in accordance with a specific mode of operation (e.g., voice, GPS). In another aspect, multimode operation chipset(s) 410 can be scheduled to operate concurrently (e.g., when Q>1) in various modes or within a multitask paradigm.

In still another aspect, the communication device 400 can comprise an FTMC 412 that can facilitate secure processing of financial transactions using the communication device 400. The FTMC 412 can include an application component 414 that can comprise one or more applications, such as a financial transaction application, which can be used to facilitate secure processing of financial transactions via the application directly or via a web site associated with an FTP.

In another aspect, the FTMC 412 can include a registration component 416 that can be used to register one or more financial accounts of the user with an FTP. The registration component 416 can receive information, such as the name associated with the account, the financial institution associated with the account, the account number, the type of account, the expiration date of a card associated with the account, a security code(s) associated with the account or card, and/or other desired information to facilitate registering the desired account(s) and processing financial transactions using the desired account(s).

In yet another aspect, the FTMC 412 can contain a synchronizer component 418 that can be used to synchronize the FTMC 412 with an FTP using a specified synchronization algorithm, wherein the synchronization can occur, for example, when the financial transaction application is opened and the user uses the communication device 400 to log in to the FTP or when the communication device 400 is used to access or enter a web site associated with the FTP and the user logs in to the FTP. The synchronization can be performed automatically or in response to a request to synchronize, which can be received from the user, for example, via selection of a synchronization button. The synchronization can, at least in part, facilitate identifying a time window (e.g., given moment in time, given period of time that is longer than a moment) that is synchronized between the FTP and FTMC 412, so that the FTP and FTMC 412 can use the same synchronized time window as a seed to facilitate generating one or more SUFACNs at a desired time (e.g., when making a product or service purchase).

In an aspect, the FTMC 412 can employ an SUFACN generator component 420 that can generate a set (e.g., one or more) of SUFACNs based at least in part on a synchronized moment or period in time between the FTMC 412 and the FTP, a PIN associated with the user, and/or a predefined coding function (e.g., one way, elliptical, or exponential function) or an encryption algorithm. In still another aspect, the FTMC 412 can include a PIN component 422 that can facilitate creation and storage of a PIN for the user. In an aspect, the PIN can be used by the SUFACN generator component 420 to facilitate generating SUFACNs. In yet another aspect, the FTMC 412 can comprise a timer component 424 that can track time (e.g., atomic or real time, other coordinated time, monotonic time, etc.) to facilitate synchronization of the FTMC 412 with the FTP at a given moment or period in time (e.g., synchronized time window), wherein the synchronized time window can be used, for example, by the SUFACN generator component 420 to facilitate generating SUFACNs, which can correspond to (e.g., respectively be the same as) SUFACNs remotely generated by the FTP.

In an aspect, the FTMC 412 can contain a selector component 426 that can be employed to select desired parameter values for respective parameters, for example, in response to received input from the user. The parameters can comprise, for example, one or more parameters relating to a financial account, one or more parameters relating to an amount to be paid by or allocated for payment by a particular financial account, one or more parameters relating to creating a PIN, one or more parameters relating to registration of a financial account, etc. The user can enter input via a user interface (UI) component 428 to facilitate selecting desired parameter values for respective parameters.

The communication device 400 can include the UI component 428, which can comprise one or more interfaces (e.g., display screens, touch screens, buttons, controls, switches, adapters, connectors, speakers, etc.) that can be utilized to facilitate presentation of information to a communication device user or receiving data input from a communication device user. In an aspect, the UI component 428 can present (e.g., display, play audio) information relating to registering financial accounts with an FTP, generating SUFACNs, processing a financial transaction, receipts relating to processed financial transactions, etc., to the communication device user. For example, the UI component 428 can operate in conjunction with the FTMC 412 to facilitate presentation of buttons, controls, or menus to facilitate logging in to an FTP, generating and displaying SUFACNs, selecting a desired financial account(s) to use in processing a financial transaction, and/or selecting respective allocated monetary amounts to be paid from respective financial accounts in relation to a financial transaction, etc.

In still another aspect, the communication device 400 also can include a processor(s) 420 that can be configured to confer functionality, at least in part, to substantially any electronic component within the communication device 400, in accordance with aspects of the disclosed subject matter. For example, the processor(s) 420 can facilitate enabling the communication device 400 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 420 can facilitate enabling the communication device 400 to process data relating to registering with an FTP, registering one or more financial accounts with an FTP, synchronizing the communication device 400 with an FTP, generating and displaying SUFACNs, and/or other data processes relating to processing financial transactions.

The communication device 400 also can contain a data store 422 that can store data structures (e.g., user data, metadata); code structure(s) (e.g., modules, objects, classes, procedures) or instructions; message hashes; neighbor cell list; information relating to registering with an FTP, registering one or more financial accounts with an FTP, synchronizing the communication device 400 with an FTP, generating and displaying SUFACNs, and/or other data processes relating to processing financial transactions; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 420 can be functionally coupled (e.g., through a memory bus) to the data store 422 in order to store and retrieve information (e.g., neighbor cell list; information relating to mobile messaging, voice calls, or other services; frequency offsets; desired algorithms; etc.) desired to operate and/or confer functionality, at least in part, to the communication platform 402, multimode operation chipset(s) 410, FTMC 412, application component 414, registration component 416, synchronizer component 418, SUFACN generator component 420, PIN component 422, timer component 424, selector component 426, interface component 428, and/or substantially any other operational aspects of the communication device 400.

Figure 5:
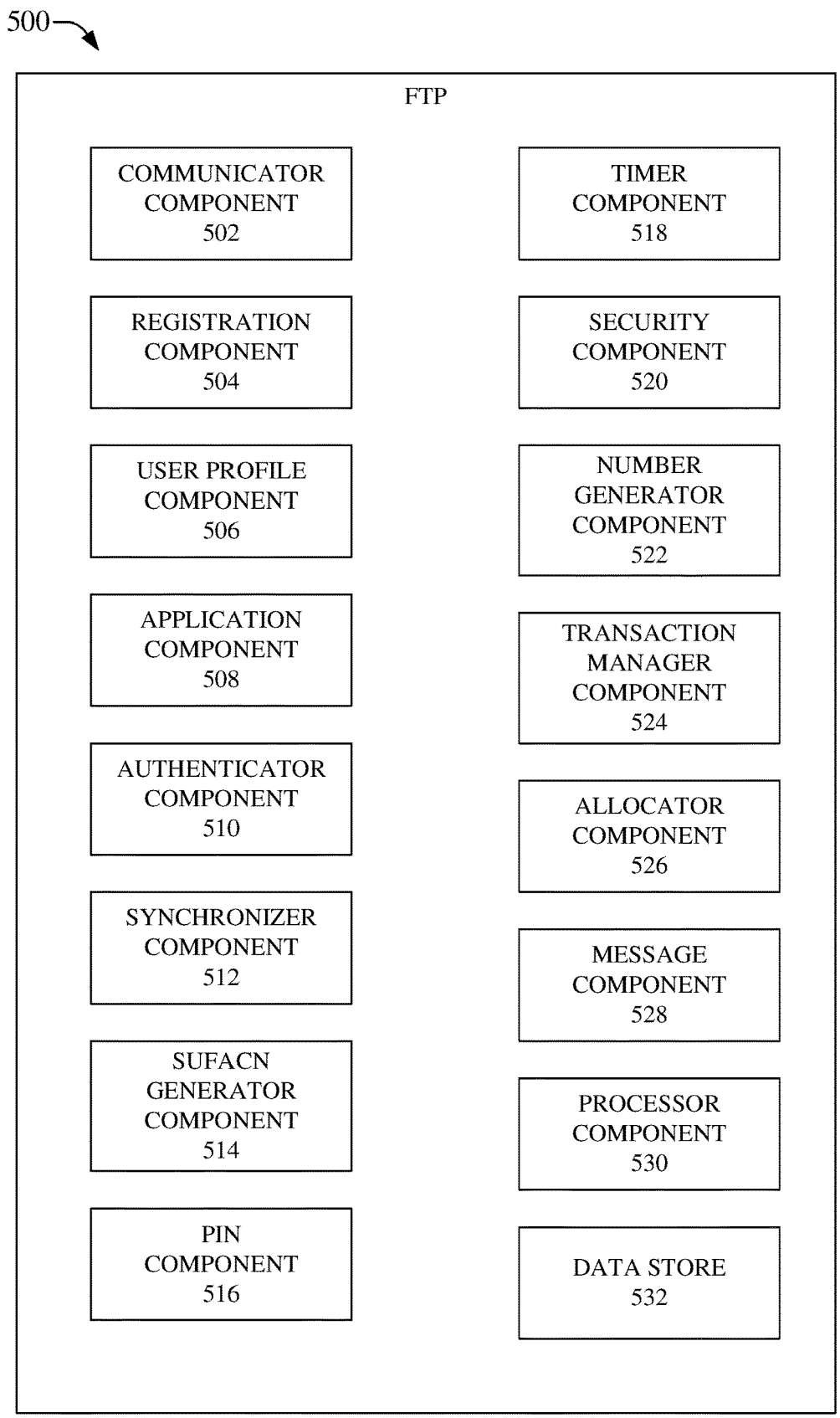
FIG. 5 illustrates a block diagram of an example financial transaction platform (FTP) in accordance with an embodiment of the disclosed subject matter.

FIG. 5 depicts a block diagram of an example FTP 500 in accordance with an embodiment of the disclosed subject matter. The FTP 500 can include a communicator component 502 that can establish a communication connection between the FTP 500 and another communication device(s) via a wired or wireless connection. The communicator component 502 also can facilitate transmitting information to and receiving information from other communication devices associated with a communication network.

The FTP 500 can contain a registration component 504 that can facilitate registering one or more communication device users so that the communication device users can use the FTP 500 to facilitate secure processing of financial transactions. The registration component 504 can receive information relating to a user, including personal information, financial account information, authentication-credentials related information, user preferences and/or selections with regard to processing of financial transactions, etc., to facilitate registering the user and registering one or more financial accounts of the user.

The FTP 500 can comprise a user profile generator component 506 that can generate respective user profiles for respective users that are registered with the FTP 500. A user profile can comprise information relating to a particular user, wherein the information can include, for example, personal information relating to the user, financial account information for a financial account(s) of the user, the user's authentication credentials, user preferences and/or selections with regard to processing of financial transactions, financial transaction history, the user's PIN, SUFACN-related information, and/or other desired information.

In another aspect, the FTP 500 can include an application component 508 that can comprise one or more financial transaction applications that can be downloaded to and used by communication devices (e.g., portable communication device) to connect to and communicate with the FTP 500, wherein one type of financial transaction application can be a mobile-device financial transaction application that enables a portable communication device to connect to and communicate with the FTP 500 without having to open a web browser. Another type of financial transaction application can be a web-based financial transaction application that can be employed for accessing a web site associated with the FTP 500 using a web browser on the portable communication device. As desired, there can be various different types of mobile-device financial transaction applications that respectively can be configured to be used with respective types of communication or operating platforms of respective portable communication devices.

In still another aspect, the FTP 500 can employ an authenticator component 510 that can facilitate authenticating a user attempting to log in and access the FTP 500 and granting a subset of access rights to the FTP 500 to an authenticated user. In an aspect, the authenticator component 510 can receive authentication credentials submitted by a user to the FTP 500, and can retrieve authentication credentials of a particular user that are stored in the user profile of that user. The authenticator component 510 can compare the received authentication credentials to the retrieved authentication credentials, and if they match each other, the authenticator component 510 can determine that the received authentication credentials are valid and the user can be authenticated, or if they do not match each other, the authenticator component 510 can determine that the received authentication credentials are invalid and the user can be denied access to (or at least further access rights to access) the FTP 500 and/or can facilitate requesting the user to provide new and valid authentication credentials.

In yet another aspect, the FTP 500 can contain a synchronizer component 512 that can be used to synchronize the FTP 500 with a communication device using a specified synchronization algorithm, wherein the synchronization can occur, for example, when a user uses the communication device to open a financial transaction application and log in to the FTP 500 or when the communication device 400 is used to access or enter a web site associated with the FTP 500 and the user logs in to the FTP 500. The synchronization can be performed automatically or in response to a request to synchronize, which can be received from the user, for example, via selection of a synchronization button on the communication device. The synchronization can, at least in part, facilitate identifying a time window (e.g., given moment in time, given period of time that is longer than a moment) that is synchronized between the FTP 500 and the communication device, so that the FTP 500 and the communication device can use the same synchronized time window as a seed to facilitate respectively and independently generating one or more SUFACNs at a desired time (e.g., the FTP 500 can generate one or more SUFACNs when an SUFACN(s) is received from a register component that received the SUFACN(s) from the communication device of the user).

In another aspect, the FTP 500 can include an SUFACN generator component 514 that can generate a set (e.g., one or more) of SUFACNs based at least in part on a moment or period in time that is synchronized between and identified by the FTP 500 and a communication device (e.g., communication device logged into the FTP 500), a PIN associated with the user, and/or a predefined coding function (e.g., one way, elliptical, or exponential function) or an encryption algorithm. In still another aspect, the FTP 500 can include a PIN component 516 that can facilitate creation and storage of a PIN for a particular communication device user. In an aspect, the PIN can be retrieved from the user profile of the user and used by the SUFACN generator component 514 to facilitate generating SUFACNs. In yet another aspect, the FTP 500 can comprise a timer component 518 that can track time (e.g., atomic or real time, other coordinated time, monotonic time, etc.) to facilitate synchronization of the FTP 500 with a communication device at a given moment or period in time (e.g., synchronized time window), wherein the synchronized time window can be used, for example, by the SUFACN generator component 514 to facilitate generating SUFACNs, which can correspond to (e.g., respectively be the same as) SUFACNs remotely generated by that communication device.

In still another aspect, the FTP 500 can employ a security component 520 that can facilitate secure transmission and reception of information (e.g., messages, indicators, SUFACNs, etc.) between the FTP 500 and other communication devices (e.g., portable communication devices, fixed communication devices, FAMCs, register components, etc.). The security component 520 can employ one or more desired encryption or decryption algorithms to encrypt data for transmission or decrypt received data. The FTP 500 can contain a number generator component 522 (e.g., random number generator, pseudo-random number generator, etc.) that can operate in conjunction with the security component 520, for example, to generate and provide desired numbers (e.g., random or pseudo-random numbers) that can be used to facilitate encrypting or decrypting data. As desired, the number generator component 522 also can generate and provide desired numbers that can be used with the SUFACN generator component 514 to facilitate generating SUFACNs.

In an aspect, the FTP 500 can comprise a transaction manager component 524 that can manage or control secure processing of financial transactions of respective communication device users. With regard to a financial transaction, the transaction manager component 524 can facilitate receiving information (e.g., SUFACNs, amount due in relation to the financial transaction, seller information, user preferences or selections, etc.) from a register component in relation to the financial transaction, analyzing, evaluating and/or otherwise processing the received information, identifying one or more financial accounts to be used for payment of an amount due in relation to the financial transaction, allocation of respective portions of payment from multiple financial accounts for the financial transaction, messaging from the FTP 500 to an FAMC(s) to request payment using a user's financial account, receiving messages from the FAMC(s) with regard to the financial transaction (e.g., approval message, denial message), providing approval or denial messages to a register component and/or user's communication device, etc. In still another aspect, the FTP 500 can include an allocator component 526 that can operate in conjunction with the transaction manager component 524 to facilitate allocating or apportioning payment of a monetary amount due in relation to a financial transaction from multiple financial accounts of a user in accordance with predefined financial transaction rules and/or user-specified preferences.

The FTP 500 also can contain a message component 528 that can be used to generate and transmit messages from the FTP 500 to other communication devices, such as portable communication devices, fixed communication devices, FAMCs, register components, etc. A message can comprise desired information (e.g., information relating to an approval of payment due in relation to a transaction, information relating to a request for payment from a user's financial account, information indicating a request for payment was denied, etc.) relating to a financial transaction of a user.

In an aspect, the FTP 500 can comprise a processor component 530 that can be configured to confer functionality, at least in part, to substantially any electronic component within the FTP 500, in accordance with aspects of the disclosed subject matter. The processor component 530 can employ one or more processors, microprocessors, or controllers that can process data (e.g., symbols, bits, or chips), such as information relating to registering users, providing a financial transaction application to a communication device, generating user profiles, authenticating users, synchronizing the FTP 500 with a portable communication device, generating SUFACNs, processing financial transactions, receiving or transmitting messages, encrypting or decrypting data, etc., or information relating to other operations of the FTP 500, etc., to facilitate operation of the FTP 500, as more fully disclosed herein, and control data flow between the FTP 500 and other components (e.g., communication device, register component, FAMC, etc.) associated with (e.g., communicatively connected to) the FTP 500.

The FTP 500 also can include a data store 532 that can store data structures (e.g., user data, application data, metadata, etc.); code structure(s) (e.g., modules, objects, classes, procedures) or instructions; information relating to registering users, providing a financial transaction application to a communication device, generating user profiles, authenticating users, synchronizing the FTP 500 with a portable communication device, generating SUFACNs, processing financial transactions, receiving or transmitting messages, encrypting or decrypting data, or information relating to other operations of the FTP 500, etc.; predefined financial transaction criteria (and associated predefined financial transaction rules); etc., to facilitate executing and controlling operations associated with the FTP 500. In an aspect, the processor component 530 can be functionally coupled (e.g., through a memory bus) to the data store 532 in order to store and retrieve information desired to operate and/or confer functionality, at least in part, to the communicator component 502, registration component 504, user profile component 506, application component 508, authenticator component 510, synchronizer component 512, SUFACN generator component 514, PIN component 516, timer component 518, security component 520, number generator component 522, transaction manager component 524, allocator component 526, message component 528, and/or substantially any other operational aspects of the FTP 500.

In view of the example systems described herein, example methodologies that can be implemented in accordance with the disclosed subject matter can be better appreciated with reference to flowcharts in FIGS. 6-12. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 6:
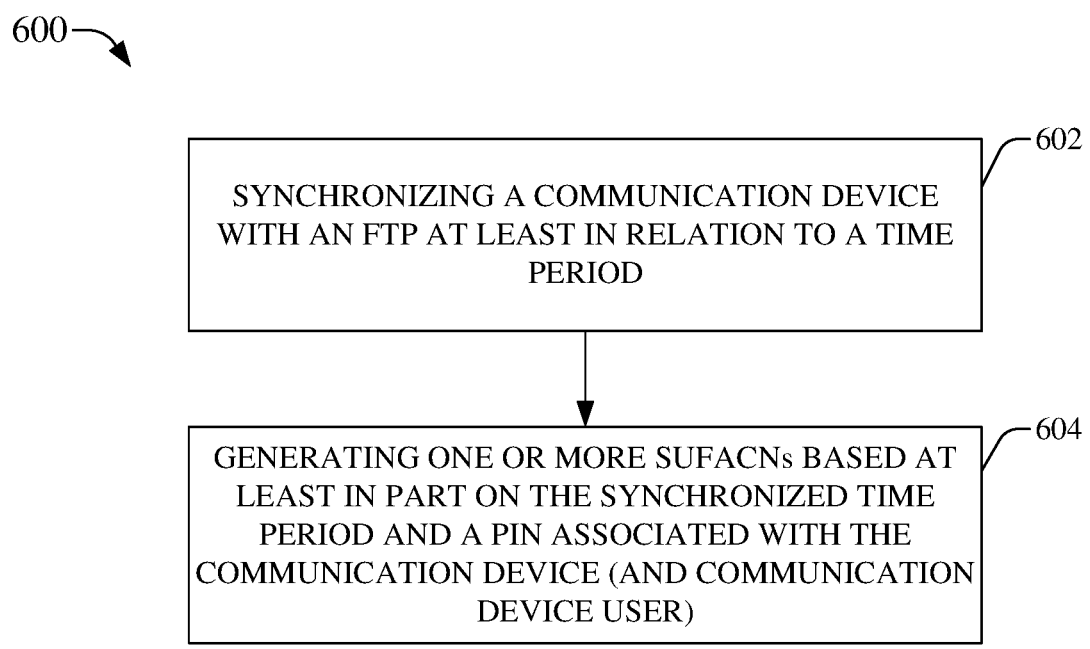
FIG. 6 illustrates a flowchart of an example methodology for using SUFACNs to facilitate secure processing of financial transactions in accordance with various aspects and embodiments of the disclosed subject matter.

FIG. 6 presents a flowchart of an example methodology 600 for using SUFACNs to facilitate secure processing of financial transactions in accordance with various aspects and embodiments of the disclosed subject matter. At 602, a communication device (e.g., portable communication device, such as a mobile phone, laptop computer, etc.) can be synchronized with an FTP at least in relation to a time period (e.g., a moment in time, a time window) at least when the communication device is authenticated with the FTP. In an aspect, when the user uses the communication device to log in to the FTP, via a financial transaction application or via a web site associated with the FTP, the communication device (and associated user) can be authenticated. All or a desired portion of the user profile of the user can be downloaded to the communication device, and the communication device can be synchronized with the FTP using a synchronization algorithm. The synchronization can facilitate identifying a time period that can be used by the communication device and the FTP to respectively and independently generate one or more SUFACNs.

At 604, one or more SUFACNs can be generated based at least in part on the synchronized time period and a PIN associated with the communication device (and communication device user). In an aspect, one or more of the generated SUFACNs can be presented (e.g., presented for scanning or viewing) via the communication device (or a printed document comprising the one or more SUFACNs) to a register component associated with a seller of a product(s) or service(s) to facilitate making payment for the purchase of the product(s) or service(s).

In an aspect, in addition to or as an alternative to an SUFACN being used to facilitate payment for a purchase from a financial account, an SUFACN also can be a promotional or discount code that, for example, can provide a cost discount for a particular product or service and/or can provide an additional benefit (e.g., a specified free item or free service with purchase of the particular product or service), and the cost discount or an additional benefit can be provided in relation to or applied to the financial transaction, wherein the discount or promotion can relate to or be offered by the seller (e.g., which also can be, or be associated with, a financial institution), a financial institution, an entity related to (e.g., providing) the service, an entity related to (e.g., manufacturing) the product, and/or another entity. For instance, an SUFACN can be used not only as a secure code to facilitate payment for a desired product or service, but also to obtain a discount on the desired product or service; or a first SUFACN can be used to facilitate payment for the desired product or service and a second SUFACN can be used to facilitate obtaining a discount in cost for the desired product or service.

In another aspect, the register component can provide the one or more SUFACNs, which were presented to the register component by the communication device, to the FTP via the communication network, and the FTP verify the one or more SUFACNs, for example, by using the synchronized time period and the user's PIN to facilitate generating one or more SUFACNs independent of the SUFACNs generated by the communication device. If one or more of the SUFACNs, which were presented by the communication device, matches the corresponding SUFACNs generated by the FTP, the FTP can validate the presented SUFACNs. Upon verification, the FTP can securely process the financial transaction to facilitate approval of payment, and payment, for the purchase, such as more fully disclosed herein.

Figure 7:
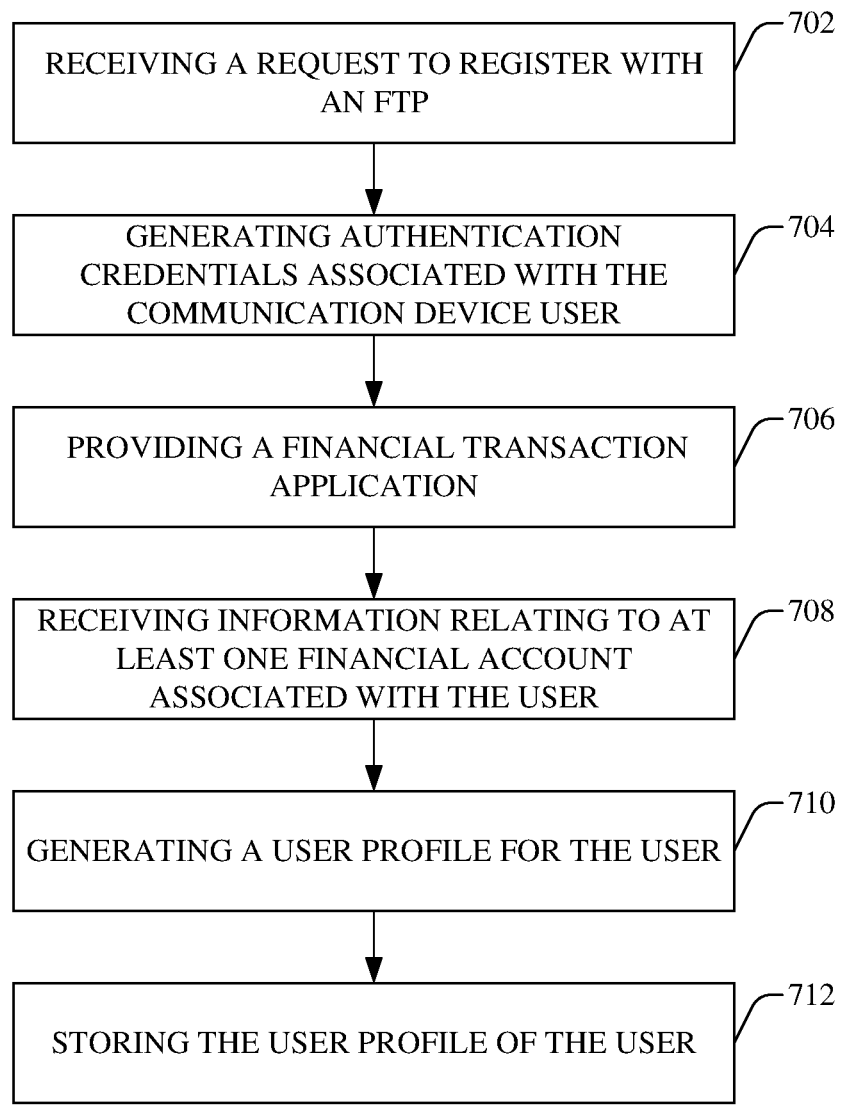
FIG. 7 depicts a flowchart of an example methodology that can register a communication device user with an FTP to facilitate secure processing of financial transactions in accordance with an aspect of the disclosed subject matter.

FIG. 7 presents a flowchart of an example methodology 700 that can register a communication device user with an FTP to facilitate secure processing of financial transactions in accordance with an aspect of the disclosed subject matter. At 702, a request to register with an FTP can be received. In an aspect, a communication device user can request to register with the FTP by using the user's portable communication device or another desired communication device (e.g., home computer) to access an online site (e.g., web site) associated with the FTP, wherein the FTP can receive the request to register. At 704, authentication credentials associated with a communication device user can be generated. In an aspect, the user and/or FTP can identify authentication credentials (e.g., username, password, etc.) that are desired to be used to facilitate identifying and authenticating the user when the user uses a communication device to log in to the FTP, and the desired authentication credentials can be generated by the FTP accordingly. A copy of the authentication credentials can be stored in a data store associated with the FTP.

At 706, a financial transaction application (e.g. mobile device financial transaction application, or financial transaction application for use in accessing the web site associated with the FTP) can be provided (e.g., downloaded), for example, to the communication device of the user. The FTP can provide the desired financial transaction application to the portable communication device. If the user used, for example, a home computer to register with the FTP, the application can be downloaded by the portable communication device when the portable communication device is used to log in to the FTP. Additionally or alternatively, the application can be downloaded to the portable communication device from the FTP via, for example, the user's home computer, by connecting a communication port of the portable communication device to a communication port of the home computer.

At 708, information relating to at least one financial account associated with the user can be received. The FTP can receive information (e.g., user's name (as listed on the financial account), address, name of financial institution, account number, etc.) relating to one or more financial accounts the user desires to register with the FTP for use in relation to secure processing of financial transactions. At 710, a user profile for the user can be generated. In an aspect, a user profile for the user can be generated by the FTP and can comprise information relating to the user, including, for example, personal information of the user (e.g., name, address, phone number, age, etc.), authentication credentials for the user, financial account information for registered accounts, financial transaction history, and/or other desired information. At 712, the user profile of the user can be stored. For instance, the FTP can store user profiles of respective users in the data store associated with the FTP.

Figure 8:
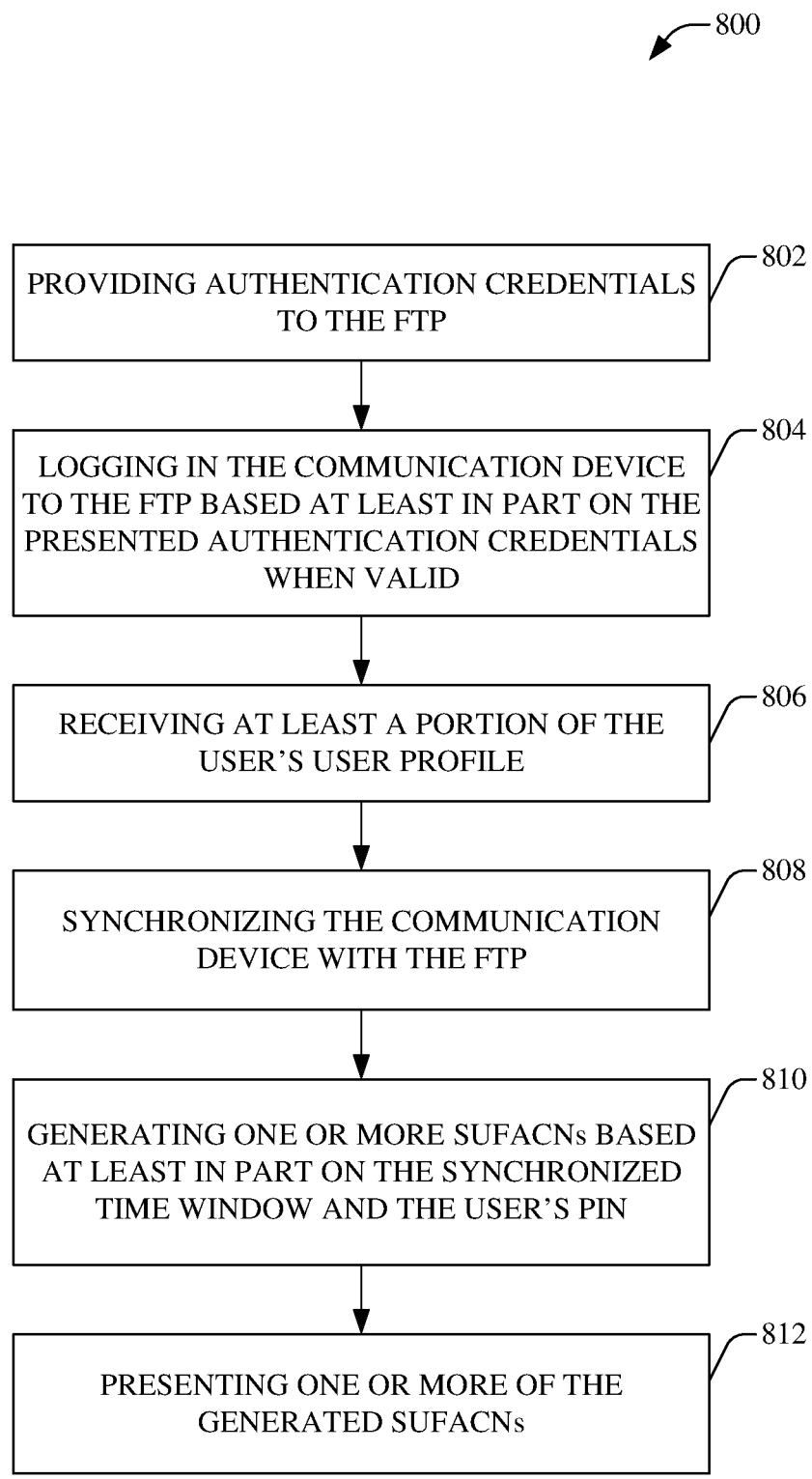
FIG. 8 illustrates a flowchart of an example methodology that can synchronize a communication device (e.g., portable communication device) with an FTP to facilitate secure processing of financial transactions in accordance with an aspect of the disclosed subject matter.

FIG. 8 depicts a flowchart of an example methodology 800 that can synchronize a communication device (e.g., portable communication device) with an FTP to facilitate secure processing of financial transactions in accordance with an aspect of the disclosed subject matter. At 802, authentication credentials can be provided (e.g., transmitted) from the communication device to the FTP. In an aspect, the user can access or open up a financial application on the communication device or access a web site associated with the FTP using a web browser on the communication device, and can present the user's authentication credentials to the FTP to log in to the FTP. The FTP can receive authentication credentials (e.g., username, password, biometric information, etc.) from the communication device associated with the user.

At 804, the communication device can be logged in to the FTP based at least in part on the presented authentication credentials, when the authentication credentials are validated by the FTP. In an aspect, the communication device (and associated user) can be authenticated and logged in to the FTP based at least in part on verification of valid authentication credentials by the FTP. In an aspect, the FTP can retrieve a copy of the user's authentication credentials from an associated data store and can compare the retrieved authentication credentials to the received authentication credentials and can determine whether there is a match. If the received authentication credentials match the retrieved authentication credentials, the communication device can be logged into and granted specified access rights to the FTP; and if the received authentication credentials do not match the retrieved authentication credentials, the FTP can deny the communication device access to the FTP.

At 806, at least a portion of the user's user profile can be received by the communication device. In an aspect, the FTP can download at least a portion of the user's user profile to the communication device to facilitate synchronization of the communication device with the FTP. At 808, the communication device can synchronize with the FTP. Using a desired synchronization algorithm or technique, the communication device and FTP can be synchronized with each other at least in relation to a time window (e.g., a given moment in time, a given period of time that is larger than a moment), so that there is a synchronized time window that can be used as a seed by the communication device and FTP to independently generate one or more corresponding SUFACNs.

At 810, one or more SUFACNs can be generated based at least in part on the synchronized time window and the user's PIN. In an aspect, the communication device can use or apply a desired function (e.g., mathematical function) to the synchronized time window and/or user's PIN, and/or one or more other seeds to generate the one or more SUFACNs.

The SUFACNs also can be desirably encrypted using a desired encryption algorithm or technique.

At 812, one or more of the generated SUFACNs can be presented. In an aspect, when the user desires to use an SUFACN(s) for a purchase, the user can use the communication device to present the desired SUFACN(s) and/or other desired information (e.g., selection of a financial account(s) to use for the financial transaction, indication of whether the transaction should be processed as a debit card or credit card transaction, user preferred allocation of payment from multiple registered financial accounts, etc.) to the register component associated with the seller from which the user is making a purchase.

Figure 9:
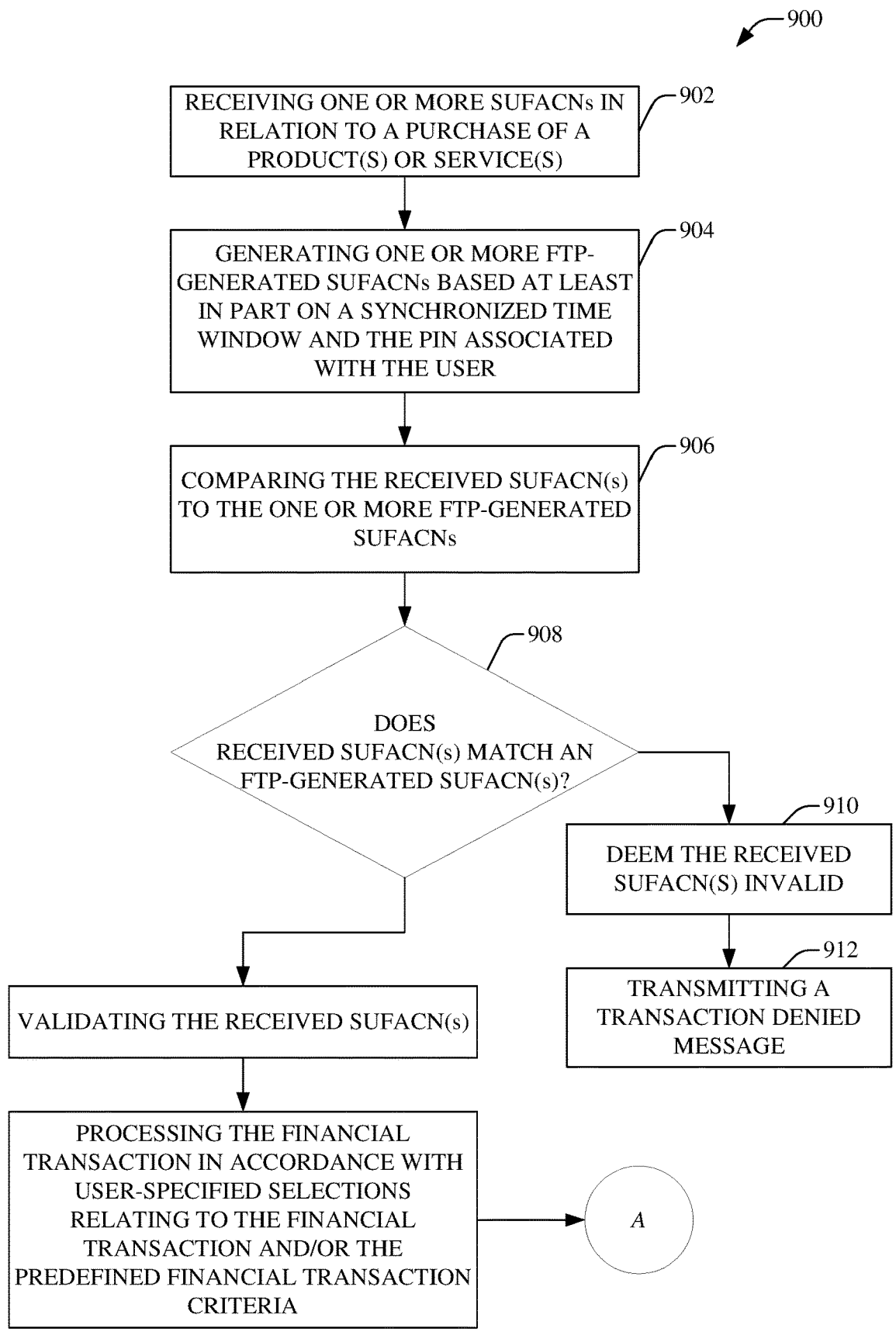
FIG. 9 depicts a flowchart of an example methodology that can securely process financial transactions using SUFACNs in accordance with an aspect of the disclosed subject matter.

FIG. 9 illustrates a flowchart of an example methodology 900 that can securely process financial transactions using SUFACNs in accordance with an aspect of the disclosed subject matter. At 902, one or more SUFACNs can be received in relation to a purchase of a product(s) or service(s) by a user of a communication device (e.g., portable communication device). For instance, the FTP can receive one or more SUFACNs from a register component associated with a seller in relation to a purchase of a product(s) or service(s) by a user who used a communication device to present the SUFACN(s) to the register component (e.g., as described with regard to act 812 of methodology 800). As desired, the SUFACNs can be encrypted using a desired encryption algorithm or technique at the time the number is generated by the communication device and/or when being communicated from the register component to the FTP.

At 904, one or more FTP-generated SUFACNs can be generated based at least in part on a synchronized time window and the PIN associated with the user. In an aspect, the FTP can generate one or more SUFACNs using the synchronized time window, which was identified when the communication device logged in to the FTP, and the PIN associated with the user. For instance, the FTP can apply a desired function to the synchronized time window, PIN, and/or one or more other desired seeds, to facilitate generating the one or more SUFACNs to compare to the received SUFACN(s). If the received SUFACN(s) was encrypted for transmission from the register component to the FTP, the FTP can decrypt the received SUFACN(s) using a desired decryption algorithm or technique, which can correspond to the encryption algorithm or technique used to encrypt the SUFACN(s).

At 906, the received SUFACN(s) can be compared to the one or more FTP-generated SUFACNs. Since the FTP is using the same synchronized time window, PIN, and/or other seeds as the communication device, one or more of the FTP-generated SUFACNs will match the received SUFACN(s) if the received SUFACN(s) is valid. If the received SUFACN(s) does not match the FTP-generated SUFACN(s), at 908, the received SUFACN(s) can be deemed invalid. At 910, a financial transaction denied message can be transmitted to the register component, communication device, and/or another other desired destination(s) (e.g., user's email address) to notify the seller and user that the financial transaction has been declined. Alternatively, the message can specify that the SUFACN(s) is not valid and can request that a valid SUFACN(s) be presented in order to process the financial transaction.

Referring again to act 906, if, at 906, the received SUFACN(s) matches the FTP-generated SUFACN(s), at 912, the received SUFACN(s) can be validated. At 914, the financial transaction can be processed in accordance with user-specified selections relating to the financial transaction and/or the predefined financial transaction criteria. For instance, the financial transaction can be processed as more fully described herein, for example, in accordance with methodology 1000, methodology 1100, or methodology 1200. At this point, as desired, methodology 900 can proceed to reference point A, wherein methodology 1000, methodology 1100, and/or methodology 1200 can proceed from reference point A.

Figure 10:
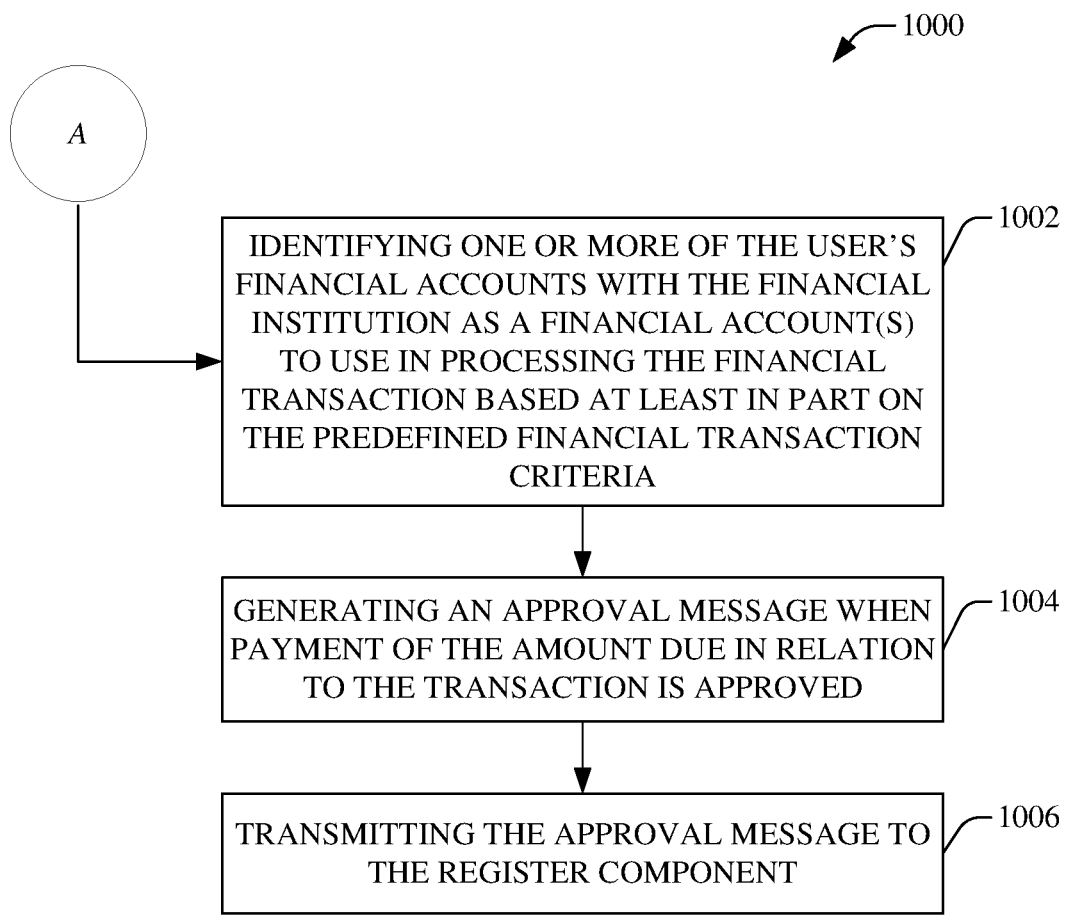
FIG. 10 illustrates a flowchart of an example methodology that can securely process financial transactions when the FTP is directly managed by a financial institution in accordance with an embodiment of the disclosed subject matter.

FIG. 10 illustrates a flowchart of an example methodology 1000 that can securely process financial transactions when the FTP is directly managed by a financial institution in accordance with an embodiment of the disclosed subject matter. As desired, methodology 1000 can proceed from reference point A of methodology 900. At 1002, one or more of the user's financial accounts with the financial institution can be identified as a financial account(s) to use in processing the financial transaction (e.g., procuring payment for the amount due in relation to the financial transaction) based at least in part on the predefined financial transaction criteria. In an aspect, the FTP can analyze the received SUFACN(s) for the financial transaction, other information relating to the financial transaction received with the SUFACN(s) (e.g., user-specified financial account(s) to use for the financial transaction and/or allocation preferences of the user when using more than one financial account to facilitate payment due in relation to a financial transaction, etc.), information in the user profile (e.g., predefined financial account selections of the user, information relating to the registered financial accounts), and/or other information, and can apply predefined financial transaction rules to the analyzed information to facilitate identifying a registered financial account(s) of the user that is to be used to process the financial transaction.

At 1004, an approval message can be generated when payment of the amount due in relation to the transaction is approved. The approval message can include information, such as, for example, an approval indicator, a monetary amount approved and paid (or to be paid) to the seller (or other desired entity) in relation to the financial transaction, and a transaction approval number, and/or, if an SUFACN(s) associated the transaction relates to a promotion or discount relating to the product or service being purchased, or to the seller or another entity, the promotion or discount associated with that SUFACN(s) can be applied to the financial transaction (e.g., the cost of the product or service can be discounted accordingly, or, for instance, in certain instances, if the promotion related to providing a user with a certain free item or free service with the purchase of the product or service, the certain free item or free service can be provided to the user at no cost). If the request for payment due on the financial transaction is denied, the FTP can generate and transmit a denial message to the register component, and the financial transaction can either not be completed or the purchaser can be requested to provide another form of payment.

At 1006, the approval message can be transmitted to the register component. In an aspect, the approval message can be transmitted from the FTP to the register component to facilitate completing the financial transaction.

Figure 11:
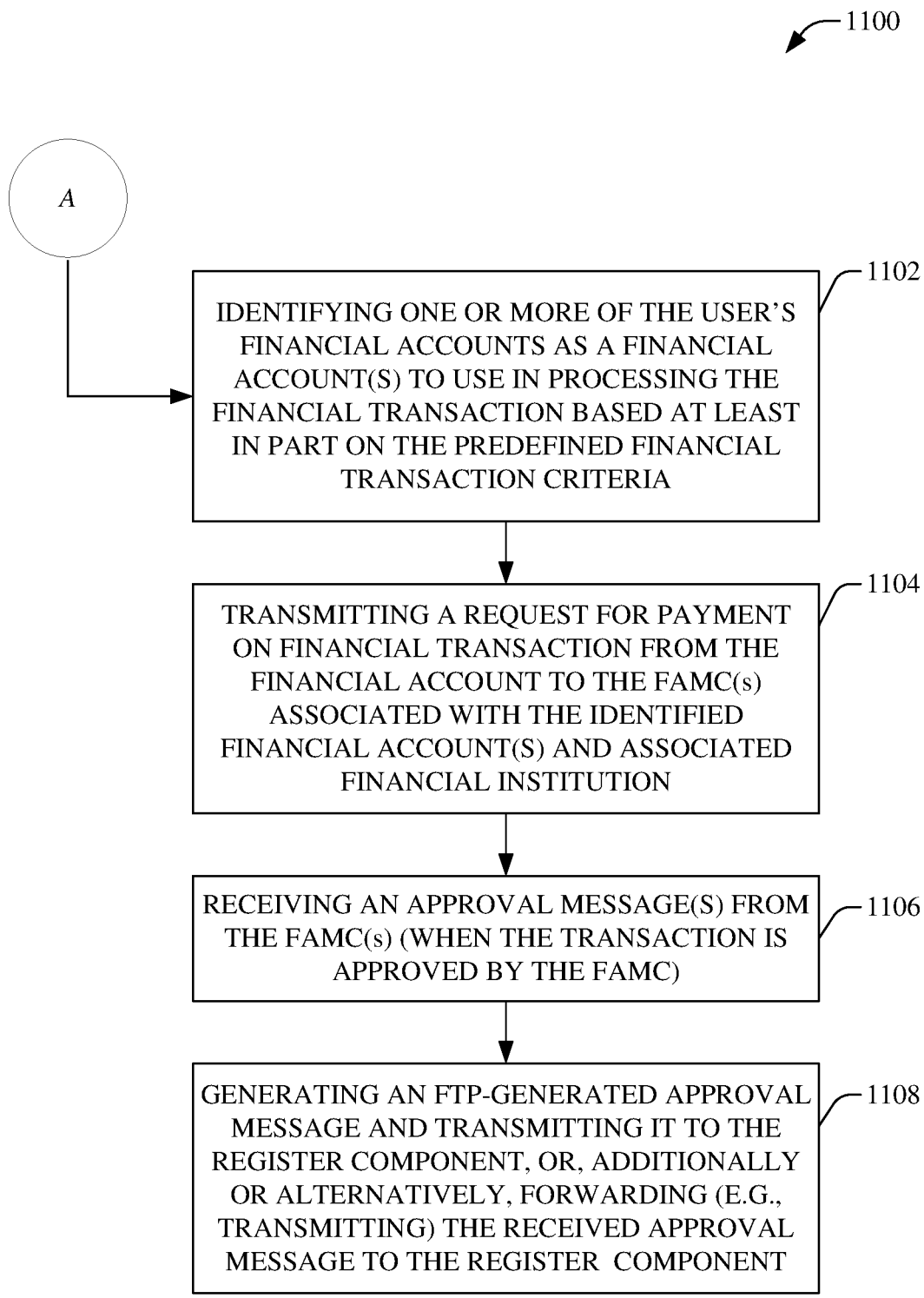
FIG. 11 depicts a flowchart of an example methodology that can securely process financial transactions when the FTP is managed by a third-party entity in accordance with an embodiment of the disclosed subject matter.

FIG. 11 depicts a flowchart of an example methodology 1100 that can securely process financial transactions when the FTP is managed by a third-party entity in accordance with an embodiment of the disclosed subject matter. As desired, methodology 1100 can proceed from reference point A of methodology 900. At 1102, one or more financial accounts associated with the user can be identified as a financial account to use in processing the financial transaction based at least in part on the predefined financial transaction criteria. In an aspect, the FTP can analyze the received SUFACN(s) for the financial transaction, other information relating to the financial transaction received with the SUFACN(s) (e.g., user-specified financial account(s) to use for the financial transaction and/or allocation preferences of the user when using more than one financial account, etc.), information in the user profile (e.g., predefined financial account selections of the user, information relating to the registered financial accounts), and/or other information, and can apply predefined financial transaction rules to the analyzed information to facilitate identifying a registered financial account(s) of the user that is to be used to process the financial transaction.

At 1104, a request for payment on financial transaction from the financial account can be transmitted to the FAMC(s) associated with the identified financial account(s) and associated financial institution. The FAMC can receive the request from the FTP and process the request, which can include information relating to the financial transaction, such as, for example, the account number, name of the account holder, amount of the financial transaction, information identifying the third-party entity making the request, authentication credentials or certificates and/or other desired information.

At 1106, an approval message can be received from an FAMC(s). If the FAMC approves the request for payment on the financial transaction, the FAMC can generate and transmit an approval message to the FTP, which can receive the approval message, wherein the approval message can include information, such as an approval indicator, a monetary amount approved and paid (or to be paid), and an transaction approval number. Additionally or alternatively, the FAMC can generate and transmit an approval message directly to the register component. If the FAMC denies the request for payment on the financial transaction, the FAMC can transmit a denial message to the FTP and/or directly to the register component, and the financial transaction can either not be completed or the purchaser can be requested to provide another form of payment.

If, at 1106, the approval message is received by the FTP, at 1108, an FTP-generated approval message can be generated and transmitted to the register component, or, additionally or alternatively, the approval message received from the FAMC can be forwarded to the register component from the FTP. An FTP-generated approval message can comprise all or a desired portion of the information contained in the approval message received from the FAMC, and, as desired, also can comprise other information, such as an FTP-generated transaction approval number, which can be a different number than (or same number as) the transaction approval number generated by the FAMC.

Figure 12:
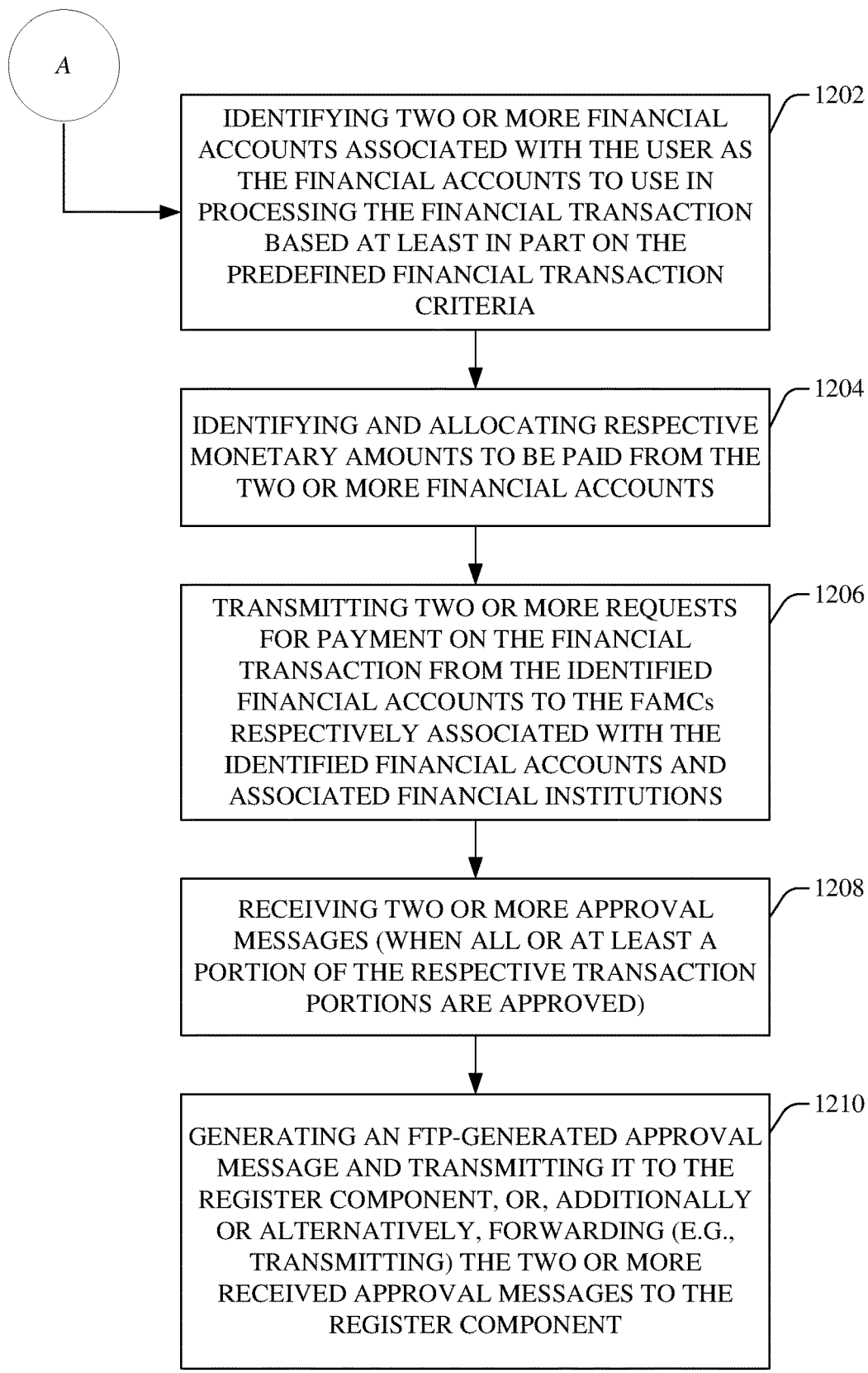
FIG. 12 depicts a flowchart of an example methodology that can securely process a financial transaction using multiple financial accounts associated with a user in accordance with an embodiment of the disclosed subject matter.

FIG. 12 illustrates a flowchart of an example methodology 1200 that can securely process a financial transaction using multiple financial accounts associated with a user in accordance with an embodiment of the disclosed subject matter. As desired, methodology 1200 can proceed from reference point A of methodology 900. At 1202, two or more financial accounts associated with the user can be identified as the financial accounts to use in processing the financial transaction based at least in part on the predefined financial transaction criteria. In an aspect, the FTP can analyze the received SUFACN(s) for the financial transaction, other information relating to the financial transaction received with the SUFACN(s) (e.g., user-specified financial account(s) to use for the financial transaction and/or allocation preferences of the user relating to payment from more than one financial account, etc.), information in the user profile (e.g., predefined financial account selections of the user, information relating to the registered financial accounts), and/or other information, and can apply predefined financial transaction rules to the analyzed information to facilitate identifying two or more registered financial accounts of the user that are to be used to process the financial transaction.

At 1204, the respective monetary amounts to be paid from the two or more financial accounts can be identified and allocated. For example, as more fully disclosed herein, based at least in part on the predefined financial transaction rules, the FTP can identify and allocate the respective monetary amounts to be paid from the two or more registered financial accounts to pay for the total amount due in relation to the financial transaction. In an aspect, the predefined financial transaction rules can relate to, for example, a minimum threshold monetary amount desired to be maintained in a financial account (e.g., bank account), use of one particular financial account over or before another financial account, interest rates of respective credit card accounts, the available limit on a credit card account, the available monetary amount on a gift card, etc.

At 1206, two or more requests for payment on the financial transaction from the identified financial accounts can be transmitted to the FAMCs respectively associated with the identified financial accounts and associated financial institutions. The respective FAMCs can receive the respective requests from the FTP, and each can process the received request, wherein each request can include information relating to the financial transaction, such as, for example, the account number, name of the account holder, amount of the financial transaction, information identifying the third-party entity making the request, authentication credentials or certificates and/or other desired information.

At 1208, two or more approval messages can be received (e.g., when all or at least a portion of the transaction portions are approved). With regard to each of the requests, if an FAMC of a respective identified financial account approves the request for payment with regard to the allocated portion of the total amount due for the financial transaction, that FAMC can generate and transmit an approval message to the FTP, which can receive the approval message, wherein the approval message can include information, such as an approval indicator, a monetary amount approved and paid (or to be paid), and an transaction approval number. Additionally or alternatively, an FAMC can generate and transmit an approval message directly to the register component. If a particular FAMC denies the request for payment for the allocated portion of the total amount due for the financial transaction, the FAMC can transmit a denial message to the FTP and/or directly to the register component, and the financial transaction can either not be completed or the purchaser can be requested to provide another form of payment.

If, at 1208, the two or more approval messages are received by the FTP, at 1210, an FTP-generated approval message can be generated and transmitted to the register component, or, additionally or alternatively, the two or more approval messages received from the respective FAMCs can be forwarded to the register component from the FTP. An FTP-generated approval message can comprise all or a desired portion of the information contained in the two or more approval messages received from the respective FAMCs, and, as desired, also can comprise other information, such as an FTP-generated transaction approval number.

Figure 13:
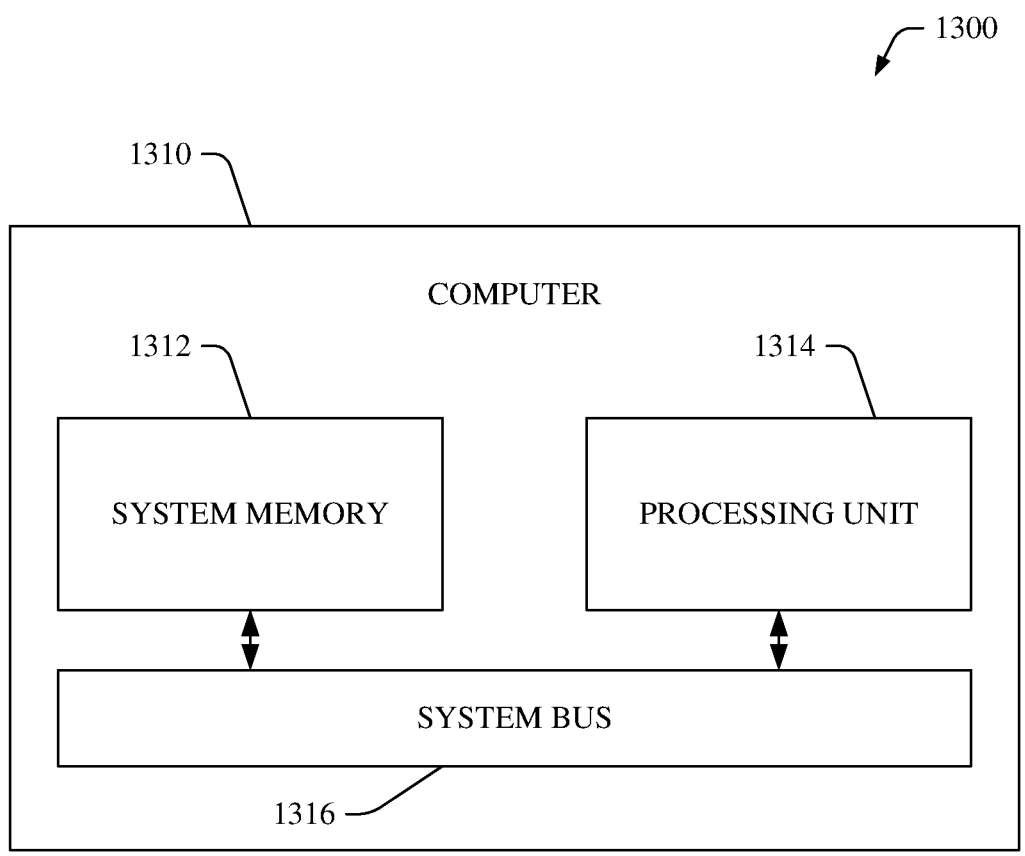
FIG. 13 illustrates an exemplary operating environment that facilitates the systems, apparatus, and methods described herein.

FIG. 13 illustrates an exemplary operating environment that facilitates the systems, apparatus and methods described herein. In order to provide additional context for various aspects of the embodiments described herein, FIG. 13 and the following discussion are intended to provide a brief, general description of a computing environment 1300 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable storage media. Computer-readable storage media can be any available media that can be accessed by the computer and includes both volatile and non-volatile media, removable and non-removable media. By way of example, and not limitation, computer-readable storage media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable storage media and capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 1300 for implementing various aspects includes a computer 1310, the computer 1310 including a processing unit 1314, a system memory 1312 and a system bus 1316. The system bus 1316 couples system components including, but not limited to, the system memory 1312 to the processing unit 1314. The processing unit 1314 can be any of various commercially available processors, such a single core processor, a multi-core processor, or any other suitable arrangement of processors. The system bus 1316 can be any of several types of bus structure that can further interconnect to a memory bus (with or without a memory controller), a peripheral bus, and a local bus using any of a variety of commercially available bus architectures. The system memory 1312 can include read-only memory (ROM), random access memory (RAM), high-speed RAM (such as static RAM), EPROM, EEPROM, flash memory, and/or the like. Additionally or alternatively, the computer 1302 can include a hard disk drive, upon which program instructions, data, and the like can be retained. Moreover, removable data storage can be associated with the computer 1310. Hard disk drives, removable media, computer-readable storage media, etc. can be communicatively coupled to the processing unit 1314 by way of the system bus 1316.

The system memory 1312 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1310 through one or more wired/wireless input devices, such as a keyboard, pointing and clicking mechanism, pressure sensitive screen, microphone, joystick, stylus pen, etc. A monitor or other type of interface can also be connected to the system bus 1316.

The computer 1310 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1310 can connect to other devices/networks by way of antenna, port, network interface adaptor, wireless access point, modem, and/or the like.

The computer 1310 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a desired location (e.g., couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be appreciated and understood that components (e.g., communication device, FTP, FTMC, AP, communication network, core network, IP-based network, FAMC, etc.), as described with regard to a particular device, system, or methodology, can include the same or similar functionality as respective components (e.g., respectively named components) as described with regard to other devices, systems, or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a first communication device configured to be associated with a communication network, wherein the communication device is associated with a user identity; and
a financial transaction management component (FTMC) that is associated with the first communication device and is configured to synchronize with a financial transaction platform (FTP) of a second communication device associated with at least one of a financial identity associated with a financial account associated with the user identity or an intermediary identity associated with the financial identity, identify a synchronized time window based at least in part on the synchronization of the FTMC with the FTP, and generate one or more single-use financial account card numbers (SUFACNs) based at least in part a synchronized time value associated with the synchronized time window, wherein the synchronized time value is used as a seed for the generation of the one or more SUFACNs, in relation to a financial transaction to purchase at least one product or service associated with a seller identity,
wherein the first communication device provides an SUFACN of the one or more SUFACNs to a register component associated with the seller identity to facilitate payment for the at least one product or service,
wherein, during a first period of time, the FTMC of the first communication device is connected and logged in to the FTP to enable the FTMC to synchronize with the FTP, and, as part of the synchronization of the FTMC with the FTP, the FTMC and the FTP mutually identify the synchronized time value and the synchronized time window based at least in part on a time instance that occurs during the first period of time,
wherein, subsequent to the synchronization, the FTMC generates the one or more SUFACNs using the synchronized time value associated with the synchronized time window as the seed for the generation of the one or more SUFACNs, wherein the SUFACN comprises payment information to facilitate payment of a net cost for the at least one product or service from the financial account associated with the user identity and cost discount information that indicates an amount of cost discount from an initial cost of the at least one product or service that is to be applied to the purchase of the at least one product or service to reduce the initial cost of the at least one product or service to the net cost, wherein the cost discount is associated with a discount provider identity that is different from the financial identity, the intermediary identity, and the seller identity, and wherein the cost discount information is received by the FTP of the second communication device from a third communication device associated with the discount provider identity and is included in the SUFACN generated by the FTMC in connection with the synchronization of the FTMC with the FTP and the generation of the one or more SUFACNs by the FTMC.

2. The system of claim 1, wherein, in response to authentication of the first communication device with the FTP, the FTMC synchronizes with the FTP at least with regard to the time, and wherein the synchronized time window spans the time instance or a defined period of time.

3. The system of claim 2, wherein one or more FTP-generated SUFACNs are independently generated, based at least in part on the synchronized time value associated with the synchronized time window, and wherein the SUFACN is determined to be valid based at least in part on a result of a comparison of the SUFACN to the one or more FTP-generated SUFACNs that indicates that the SUFACN matches an FTP-generated SUFACN of the one or more FTP-generated SUFACNs.

4. The system of claim 1, wherein the FTMC receives input information via an interface, wherein the input information indicates a threshold payment amount to apply with respect to the financial account, wherein, based at least in part on the input information, the financial account is utilized to facilitate the payment of the net cost, in response to the net cost being determined to not exceed the threshold payment amount, and wherein a second financial account associated with the user identity is utilized to facilitate the payment of the net cost, in response to the net cost being determined to exceed the threshold payment amount.

5. The system of claim 1, wherein the SUFACN is valid only for the financial transaction and is not valid for any other financial transaction.

6. The system of claim 1, wherein the financial account associated with the user identity is used with regard to the financial transaction to facilitate the payment of the net cost for the at least one product or service, and wherein an option regarding whether to register the financial account associated with the user identity with the FTP or to use the financial account only for the financial transaction is provided to the user.

7. The system of claim 1, wherein the financial account is included in a set of financial accounts associated with the user identity, and wherein the set of financial accounts comprise at least one of a bank account, a credit union account, a credit card account, or a gift card account.

8. The system of claim 1, further comprising:
a user interface associated with the FTMC and the first communication device, wherein the user interface displays the SUFACN in a scannable form to facilitate scanning of the SUFACN by the register component to facilitate communication of the SUFACN to the register component.

9. The system of claim 1, wherein, to facilitate the generation of the one or more SUFACNs, the FTMC applies a defined SUFACN coding function to at least one of the synchronized time value associated with the synchronized time window or a personal identification number associated with the first communication device, wherein the SUFACN coding function is based at least in part on a one-way-type coding function, an elliptical-type coding function, or an exponential-type coding function.

10. A system, comprising:
a financial transaction platform (FTP) configured to comprise:
a synchronizer component configured to synchronize, at least with regard to time, the FTP of a first communication device with a second communication device associated with a user identity to identify a synchronized time period that is synchronized with the second communication device, wherein the first communication device is associated with a financial identity or an intermediary identity associated with the financial identity, wherein, during a first period of time, the second communication device is connected and logged in to the FTP to enable the second communication device to synchronize with the FTP, and, as part of the synchronization of the second communication device with the FTP, the second communication device and the FTP mutually identify a synchronized time value associated with the synchronized time period as a function of a time instance that occurs during the first period of time,
wherein, subsequent to the synchronization, the FTP is configured to receive a single-use financial account card number (SUFACN) from a register component associated with a seller identity, wherein the SUFACN is generated, based at least in part on the synchronized time value that is utilized as a seed for the generation of the SUFACN, and wherein the SUFACN had been received by the register component in connection with a financial transaction to purchase a product or a service,
wherein the SUFACN comprises payment data, to facilitate payment of a net cost for the product or the service from a financial account associated with the user identity, and cost discount data that relates to a cost discount from an initial cost of the product or the service that is to be applied to the purchase of the product or the service to reduce the initial cost of the product or the service to the net cost,
wherein the cost discount is associated with another identity that is different from the financial identity, the intermediary identity, and the seller identity, and
wherein the cost discount data is received by the FTP of the first communication device from a third communication device associated with said another identity and is included in the SUFACN generated by the second communication device in connection with the synchronization of the second communication device with the FTP; and
an SUFACN generator component configured to generate one or more FTP-generated SUFACNs based at least in part on the synchronized time value, wherein the SUFACN generator component generates the one or more FTP-generated SUFACNs independent of the SUFACN generated by the second communication device, and wherein the one or more FTP-generated SUFACNs facilitate a determination of whether the SUFACN is valid.

11. The system of claim 10, wherein the FTP is configured to transmit at least a portion of a user profile associated with the user identity to the second communication device to facilitate the generation of the SUFACN.

12. The system of claim 10, wherein, in response to receiving the SUFACN, the FTP is configured to communicate a request to honor the cost discount to the third communication device associated with said another identity that is associated with an offer of the cost discount, and facilitate application of the cost discount to the purchase of the product or the service in response to receiving an approval message from the third communication device that indicates the cost discount is approved, and wherein the request comprises the cost discount data obtained from the SUFACN.

13. The system of claim 10, wherein the user identity is associated with a set of financial accounts comprising credit accounts that include the financial account, wherein the FTP is configured to determine that the financial account has a lowest interest rate as compared to other interest rates of other credit accounts of the credit accounts, and wherein, in response to determining that the financial account has the lowest interest rate as compared to the other interest rates of the other credit accounts, the FTP is configured to select the financial account to facilitate at least a portion of the payment of the net cost for the product or the service.

14. The system of claim 10, wherein the user identity is associated with a set of financial accounts comprising the financial account, wherein the FTP is configured to determine that the financial account is associated with an earning of a defined amount of points or a defined amount of value in connection with utilizing the financial account to facilitate the payment of the net cost for the product or the service, and wherein, in response to determining that the financial account is associated with the earning of the defined amount of points or the defined amount of value in connection with utilizing the financial account to facilitate the payment of the net cost for the product or the service, the FTP is configured to select the financial account to facilitate the payment of the net cost for the product or the service.

15. The system of claim 10, wherein, in response to the SUFACN being identified as valid, the FTP is further configured to identify one or more financial accounts associated with the user identity that is or are to be used to provide at least a portion of the payment of the net cost for the product or the service, based at least in part on one or more defined financial transaction rules or a set of preferences associated with the user identity, and wherein the one or more financial accounts comprise the financial account.

16. The system of claim 15, wherein the FTP is further configured to transmit at least one request for at least the portion of the payment of the net cost from at least one financial account of the one or more financial accounts to at least one financial account management component (FAMC) associated with the at least one financial account to facilitate at least the portion of the payment of the net cost from the at least one financial account, and wherein the at least one financial account comprises the financial account.

17. The system of claim 16, wherein, in response to receipt of at least one approval indicator from the at least one FAMC by the FTP, the FTP is further configured to communicate at least one approval message to at least one of the register component or the second communication device, wherein the at least one approval indicator indicates that at least the portion of the payment of the net cost from the at least one financial account has been approved.

18. The system of claim 15, wherein the one or more financial accounts comprises a first financial account and a second financial account, wherein the financial account is the first financial account, and wherein the FTP is further configured to allocate payment of a first portion of the net cost from the first financial account and a second portion of the net cost from the second financial account.

19. A method, comprising:

synchronizing, by a system including a processor, in relation to a time period, a first communication device associated with a user identity with a financial transaction platform (FTP) of a second communication device to identify a synchronized time period that is synchronized between the first communication device and the FTP, wherein the second communication device is associated with a financial identity or an intermediary identity associated with the financial identity, wherein the synchronizing of the first communication device with the FTP occurs during a first period of time that the first communication device is connected and logged in to the FTP, and wherein the user identity is associated with a financial account with the financial identity;

in connection with the synchronizing of the first communication device with the FTP during the first period of time, identifying, by the system, a synchronized time value associated with the synchronized time period based at least in part on a time instance that occurs during the first period of time; and during a second period of time subsequent to the synchronizing, generating, by the system, a single-use financial account card number (SUFACN) using the synchronized time value associated with the synchronized time period as a seed for the generating of the SUFACN, wherein the SUFACN is used to facilitate payment for a product or a service, wherein the SUFACN is presented to a register component associated with a seller identity to facilitate the payment for the product or the service, wherein the SUFACN comprises payment information, to facilitate payment of a remaining cost of the product or the service using the financial account associated with the user identity, and cost discount information that indicates an amount of a cost discount from an initial cost of the product or the service, wherein the amount of the cost discount is able to be applied to the purchase of the product or the service to decrease the initial cost of the product or the service to the remaining cost, wherein the cost discount is provided by another identity that is different from the financial identity, the intermediary identity, and the seller identity, and wherein the cost discount information is received by the FTP of the second communication device from a third communication device associated with said another identity and is included in the SUFACN generated by the communication device in connection with the synchronizing of the communication device with the FTP.

20. The method of claim 19, further comprising:

communicating, by the system, the SUFACN to the register component associated with the seller identity to facilitate payment of the remaining cost due for purchase of the product or the service, wherein the SUFACN is determined to be valid based at least in part on determining that the SUFACN matches an FTP-generated SUFACN, and wherein the FTP-generated SUFACN is generated using the synchronized time value associated with the synchronized time period.

\* \* \* \* \*